US012100542B2

(12) United States Patent
Zhang et al.

(10) Patent No.: US 12,100,542 B2
(45) Date of Patent: Sep. 24, 2024

(54) COUPLED INDUCTOR AND POWER MODULE

(71) Applicant: Delta Electronics (Shanghai) CO., LTD, Shanghai (CN)

(72) Inventors: Mingzhun Zhang, Shanghai (CN); Jinping Zhou, Shanghai (CN); Min Zhou, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 243 days.

(21) Appl. No.: 17/195,612

(22) Filed: Mar. 8, 2021

(65) Prior Publication Data

US 2021/0287848 A1 Sep. 16, 2021

(30) Foreign Application Priority Data

Mar. 10, 2020 (CN) ........................ 202010163581.6

(51) Int. Cl.
*H01F 27/28* (2006.01)
*H01F 27/24* (2006.01)
(Continued)

(52) U.S. Cl.
CPC ........... *H01F 27/346* (2013.01); *H01F 27/24* (2013.01); *H01F 27/28* (2013.01); *H01F 27/40* (2013.01); *H01F 27/306* (2013.01)

(58) Field of Classification Search
CPC ........ H01F 27/346; H01F 27/24; H01F 27/28; H01F 27/40; H01F 27/306; H01F 2003/106; H01F 3/10; H01F 27/2847; H01F 17/04; H01F 27/323
See application file for complete search history.

(56) References Cited

U.S. PATENT DOCUMENTS 9,336,941 B1 5/2016 Ikriannikov
9,373,438 B1 6/2016 Ikriannikov et al.
(Continued)

FOREIGN PATENT DOCUMENTS

CN 201311823 Y 9/2009
CN 101789307 A 7/2010
(Continued)

OTHER PUBLICATIONS

The 1st Office Action dated Jan. 28, 2022 for IN patent application No. 202134009660.
(Continued)

*Primary Examiner* — Tuyen T Nguyen
(74) *Attorney, Agent, or Firm* — Qinghong Xu

(57) ABSTRACT

The present disclosure provides a coupled inductor and a power module. The coupled inductor includes a magnetic core, a first winding, a second winding, and an adjustment structure located in the magnetic core. At least part of the first winding and at least part of the second winding are in the magnetic core, a stacked portion of the first winding and a stacked portion of the second winding are stacked in a height direction, a non-stacked portion of the first winding and the second winding are not stacked in the height direction, and a non-stacked portion of the second winding and the first winding are not stacked in the height direction. The adjustment structure which is adjoining the non-stacked portion of the first winding and the non-stacked portion of the second winding and has a lower magnetic permeability than that of the magnetic core may adjusts leakage inductance.

17 Claims, 34 Drawing Sheets

(51) Int. Cl.

| | |
|---|---|
| ***H01F 27/34*** | (2006.01) |
| ***H01F 27/40*** | (2006.01) |
| *H01F 27/30* | (2006.01) |

(56) References Cited

U.S. PATENT DOCUMENTS

| | | | | |
|---|---|---|---|---|
| 2008/0007133 | A1 | 1/2008 | Soken | |
| 2017/0047155 | A1 | 2/2017 | Yao et al. | |
| 2017/0084382 | A1 * | 3/2017 | Zhou | H01F 27/346 |
| 2020/0035396 | A1 | 1/2020 | Weis | |

FOREIGN PATENT DOCUMENTS

| | | | | | |
|---|---|---|---|---|---|
| CN | 102007553 | A | | 4/2011 | |
| CN | 102460608 | A | | 5/2012 | |
| CN | 102576593 | A | | 7/2012 | |
| CN | 103081325 | A | | 5/2013 | |
| CN | 103141021 | A | | 6/2013 | |
| CN | 102460608 | B | | 10/2014 | |
| CN | 103141021 | B | | 9/2015 | |
| CN | 104952591 | A | | 9/2015 | |
| CN | 103081325 | B | | 8/2016 | |
| CN | 106935384 | A | | 7/2017 | |
| DE | 202014005885 | U1 | * | 9/2014 | H01F 27/2847 |
| EP | 0855723 | A2 | | 7/1998 | |

OTHER PUBLICATIONS

1st Office Action dated Oct. 30, 2023 for Chinese Application No. 202010163581.6.

Notice of Allowance dated Aug. 5, 2024 of Chinese Application No. 2020101635816.

* cited by examiner

COUPLED INDUCTOR AND POWER MODULE

CROSS-REFERENCE TO RELATED APPLICATIONS

This application claims priority to Chinese Patent Application No. 202010163581.6, filed on Mar. 10, 2020, the contents of which are hereby incorporated by reference in their entirety for all purposes.

TECHNICAL FIELD

The present disclosure relates to the technical field of electronic devices, and in particular, to a coupled inductor and a power module.

BACKGROUND

In recent years, with the development of technologies about data centers, artificial intelligence and so on, central processing units, graphics processors and various integrated chips are working faster and faster, and operation current is getting larger and larger. Requirements on power density, efficiency, dynamic performance, and saturation current capability of power modules, such as Voltage Regulator Module (VRM), are also increasing.

An output inductor often occupies the largest space in the VRM, and selection of inductance also directly affects the efficiency and dynamic performance of the entire VRM. It is an effective way to use coupled inductors to reduce the volume of the inductor and improve the efficiency and dynamic performance of the VRM. Magnetic powder core has advantages of stress insensitivity, simple one-piece molding process, and soft saturation characteristics. Therefore, the powder core is more suitable for coupled inductors with high frequency and small volume. However, due to low relative permeability of the powder core, which is usually in a range of 1 to 200, a coupled inductor based on the powder core has large leakage inductance and poor coupling. If a coupled inductor of small leakage inductance is designed according to traditional methods, characteristics of saturation current will be sacrificed. Therefore, problems of the large leakage inductance, poor coupling, and small saturation current of the traditional coupled inductors based on the powder core have become technical problems that need to be solved urgently.

It should be noted that the information disclosed in the Background section above is only used to enhance the understanding of the background of the present disclosure, and therefore may include information that does not constitute the prior art known by those of ordinary skill in the art.

SUMMARY

The purpose of the present disclosure is to provide a coupled inductor and a power module, thereby at least to some extent overcoming one or more problems caused by the limitations and defects of the related technology.

According to a first aspect of the present disclosure, there is provided a coupled inductor including a magnetic core, a first winding, a second winding, and an adjustment structure. At least part of the first winding and at least part of the second winding are located in the magnetic core, a stacked portion of the first winding and a stacked portion of the second winding are stacked in a height direction, a non-stacked portion of the first winding and the second winding are not stacked in the height direction, and a non-stacked portion of the second winding and the first winding are not stacked in the height direction. The adjustment structure is located in the magnetic core and adjoining the non-stacked portion of the first winding and the non-stacked portion of the second winding, wherein a magnetic permeability of the adjustment structure is less than a magnetic permeability of the magnetic core.

In some embodiments, the first winding extends from a first end of the first winding to a second end of the first winding and wraps around an axis in the height direction along a first direction, the second winding extends from a first end of the second winding to a second end of the second winding and wraps around the axis in the height direction along a second direction opposite to the first direction, and a polarity of the first end of the first winding and a polarity of the first end of the second winding are opposite.

In some embodiments, when a first current flows in via the first end of the first winding and flows out from the second end of the first winding, and a second current flows in via the first end of the second winding and flows out from the second end of the second winding, a magnetic flux generated by the first current in the stacked portion of the first winding and a magnetic flux generated by the second current in the stacked portion of the second winding cancel each other at least in part, and the magnetic flux generated by the first current in the non-stacked portion of the first winding and the magnetic flux generated by the second current in the non-stacked portion of the second winding are adjusted by the adjustment structure.

In some embodiments, the stacked portion of the first winding and the stacked portion of the second winding are contacted to each other through an insulating layer, and the stacked portion of the first winding and the stacked portion of the second winding are not stacked with the adjustment structure in the height direction.

In some embodiments, a number of turns of the first winding is one, and a number of turns of the second winding is one, the first winding includes a single-stranded wire, a multi-stranded wire, or a sheet metal piece, and the second winding includes a single-stranded wire, a multi-stranded wire, or a sheet metal piece, the first winding is C-shaped or U-shaped, and the second winding is C-shaped or U-shaped.

In some embodiments, the first end and the second end of the first winding protrude from a first side of the magnetic core, the first end and the second end of the second winding protrude from a second side of the magnetic core, and the first side is opposite to the second side. In some embodiments, the first end of the first winding protrudes from the first side of the magnetic core, the first end of the second winding protrudes from the second side of the magnetic core, the second end of the first winding and the second end of the second winding protrude from a third side of the magnetic core, the first side is opposite to the second side, and the third side is adjacent to the first side and the second side.

In some embodiments, the first end of the first winding and the first end of the second winding are bent upward in the height direction, and the second end of the first winding and the second end of the second winding are bent downward in the height direction. In some embodiments, the first end of the first winding, the second end of the first winding, the first end of the second winding, and the second end of the second winding are bent downward in the height direction.

In some embodiments, the stacked portion of the first winding includes a first stacked portion and a second stacked portion, the non-stacked portion of the first winding includes a first non-stacked portion, a second non-stacked portion, and a third non-stacked portion, and the first non-stacked portion, the first stacked portion, the second non-stacked portion, the second stacked portion, and the third non-stacked portion of the first winding are connected in sequence from the first end of the first winding to the second end of the first winding. The stacked portion of the second winding includes a first stacked portion and a second stacked portion, the non-stacked portion of the second winding includes a first non-stacked portion, a second non-stacked portion, and a third non-stacked portion, and the first non-stacked portion, the first stacked portion, the second non-stacked portion, the second stacked portion, and the third non-stacked portion of the second winding are in connected sequence from the first end of the second winding to the second end of the second winding, and a contact surface between the first winding and the second winding is located on a horizontal plane.

In some embodiments, the adjustment structure includes a first adjustment structure and a second adjustment structure, the first adjustment structure is adjoining the first non-stacked portion of the first winding, the third non-stacked portion of the first winding and the second non-stacked portion of the second winding, the first adjustment structure extends from the horizontal plane in a direction away from the first winding, the second adjustment structure is adjoining the first non-stacked portion of the second winding, the third non-stacked portion of the second winding and the second non-stacked portion of the first winding, and the second adjustment structure extends from the horizontal plane in a direction away from the second winding.

In some embodiments, a first sub-portion of the first adjustment structure and the first non-stacked portion of the first winding are stacked in the height direction, a second sub-portion of the first adjustment structure and the third non-stacked portion of the first winding are stacked in the height direction, a length of the first sub-portion of the first adjustment structure is greater than or equal to a height of the first adjustment structure, a length of the second sub-portion of the first adjustment structure is greater than or equal to the height of the first adjustment structure, the first adjustment structure is adjoining the first side of the magnetic core, the first adjustment structure is located between the first side and the second non-stacked portion of the second winding, and a height of the first adjustment structure is less than or equal to a height of the second winding. A first sub-portion of the second adjustment structure and the first non-stacked portion of the second winding are stacked in the height direction, a second sub-portion of the second adjustment structure and the third non-stacked portion of the second winding are stacked in the height direction, a length of the first sub-portion of the second adjustment structure is greater than or equal to a height of the second adjustment structure, a length of the second sub-portion of the second adjustment structure is greater than or equal to the height of the second adjustment structure, the second adjustment structure is adjoining the second side of the magnetic core opposite to the first side, the second adjustment structure is located between the second side and the second non-stacked portion of the first winding, and the height of the second adjustment structure is less than or equal to the height of the first winding.

In some embodiments, the adjustment structure includes a third adjustment structure and a fourth adjustment structure. The third adjustment structure is adjoining the first non-stacked portion of the first winding, the third non-stacked portion of the first winding, and the second non-stacked portion of the second winding, and the third adjustment structure extends from the horizontal plane in the direction away from the second winding. The fourth adjustment structure is adjoining the first non-stacked portion of the second winding, the third non-stacked portion of the second winding, and the second non-stacked portion of the first winding, and the fourth adjustment structure extends from the horizontal plane in the direction away from the first winding.

In some embodiments, the third adjustment structure is located between the first non-stacked portion of the first winding and the third non-stacked portion of the first winding, and the third adjustment structure is adjoining the first side of the magnetic core. A first sub-portion of the third adjustment structure and the second non-stacked portion of the second winding are stacked in the height direction, a width of the first sub-portion of the third adjustment structure is greater than or equal to a height of the third adjustment structure and less than or equal to a width of the second non-stacked portion of the second winding, and the height of the third adjustment structure is less than or equal to the height of the first winding. The fourth adjustment structure is located between the first non-stacked portion of the second winding and the third non-stacked portion of the second winding, and the fourth adjustment structure is adjoining the second side, which is opposite to the first side, of the magnetic core. A first sub-portion of the fourth adjustment structure and the second non-stacked portion of the first winding are stacked in the height direction, a width of the first sub-portion of the fourth adjustment structure is greater than or equal to a height of the fourth adjustment structure and less than or equal to a width of the second non-stacked portion of the first winding, and a height of the fourth adjustment structure is less than or equal to the height of the second winding.

In some embodiments, the adjustment structure includes a fifth adjustment structure and a sixth adjustment structure. The fifth adjustment structure is located between a first stacked portion of the second winding and a second stacked portion of the second winding, the fifth adjustment structure is adjoining the first stacked portion of the second winding and the second stacked portion of the second winding, the fifth adjustment structure is adjoining the second non-stacked portion of the first winding and the second non-stacked portion of the second winding, the fifth adjustment structure extends from the horizontal plane in a direction away from the first winding, and a height of the fifth adjustment structure is less than or equal to the height of the second winding. The sixth adjustment structure is located between a first stacked portion of the first winding and a second stacked portion of the first winding, the sixth adjustment structure is adjoining the first stacked portion of the first winding and the second stacked portion of the first winding, the sixth adjustment structure is adjoining the second non-stacked portion of the first winding and the second non-stacked portion of the second winding, the sixth adjustment structure extends from the horizontal plane in the direction away from the second winding, and a height of the sixth adjustment structure is less than or equal to the height of the first winding.

In some embodiments, the magnetic core includes an iron powder, an alloy powder, an amorphous powder, or a nanocrystalline powder that are covered with an insulating layer, the first winding and the second winding are embedded in the magnetic core, the adjustment structure is embedded in the magnetic core, and the coupled inductor is integrally formed by molding process.

In some embodiments, the magnetic core includes a ferrite, and the first winding, the second winding, and the magnetic core are assembled together.

In some embodiments, the magnetic core includes a first cover plate and a second cover plate disposed opposite to each other, and a first winding post, a second winding post, a third winding post, a first side post, and a second side post connecting the first cover plate to the second cover plate, and the adjustment structure is located on at least one of the first winding post, the second winding post, and the third winding post. The first winding surrounds the first winding post and the second winding post, and the second winding surrounds the second winding post and the third winding post.

In some embodiments, the magnetic core is formed by connecting a first magnetic core to a second magnetic core opposite to each other, wherein any one of the first magnetic core and the second magnetic core includes a first magnetic post, a second magnetic post, and a third magnetic post arranged in sequence in a width direction, and a fourth magnetic post and a fifth magnetic post arranged in a length direction, and a cover plate connecting to the first magnetic post, the second magnetic post, the third magnetic post, the fourth magnetic post, and the fifth magnetic post. The first magnetic post and the third magnetic post are located on opposite sides of the cover plate, and the fourth magnetic post and the fifth magnetic post are located on opposite sides of the cover plate. The first magnetic post of the first magnetic core and the first magnetic post of the second magnetic core are connected to each other to form the first winding post, the second magnetic post of the first magnetic core and the second magnetic post of the second magnetic core are connected to each other to form the second winding post, the third magnetic post of the first magnetic core and the third magnetic post of the second magnetic core are connected to each other to form the third winding post, the fourth magnetic post of the first magnetic core and the fourth magnetic post of the second magnetic core are connected to each other to form the first side post, the fifth magnetic post of the first magnetic core and the fifth magnetic post of the second magnetic core are connected to each other to form the second side post, and the cover plate is used as the first cover plate and the second cover plate, respectively. A part of the adjustment structure is located between the first magnetic post of the first magnetic core and the first magnetic post of the second magnetic core, another part of the adjustment structure is located between the second magnetic post of the first magnetic core and the second magnetic post of the second magnetic core, and another part of the adjustment structure is located between the third magnetic post of the first magnetic core and the third magnetic post of the second magnetic core.

In some embodiments, the adjustment structure includes air, insulating glue, or magnetic material.

According to a second aspect of the present disclosure, there is provided another coupled inductor including a magnetic core, a plurality of winding units, and a plurality of adjustment structures, wherein each of the winding units includes a first winding and a second winding, at least part of the first winding and at least part of the second winding are located in the magnetic core, a stacked portion of the first winding and a stacked portion of the second winding are stacked in a height direction, a non-stacked portion of the first winding and the second winding are not stacked in the height direction, a non-stacked portion of the second winding and the first winding are not stacked in the height direction, the plurality of adjustment structures are located in the magnetic core and correspond to the plurality of winding units in an one-to-one manner, each of the adjustment structures is adjoining a non-stacked portion of the first winding and a non-stacked portion of the second winding, and a magnetic permeability of the adjustment structure is less than a magnetic permeability of the magnetic core.

According to a third aspect of the present disclosure, there is provided a power module, including a first switch circuit, a second switch circuit, and any one of the above-mentioned coupled inductors, wherein the first switch circuit is electrically connected to a first end of the first winding, the second switch circuit is electrically connected to a first end of the second winding, and a second end of the first winding and a second end of the second winding are electrically connected to an external load.

The coupled inductor and power module provided by the present disclosure may adjust leakage inductance on a leakage magnetic flux path by providing an adjustment structure with a low magnetic permeability around non-stacked windings.

It should be understood that the above general description and the following detailed description are merely exemplary and explanatory, and should not limit the present disclosure.

BRIEF DESCRIPTION OF THE DRAWINGS

The drawings herein are incorporated in and constitute a part of this specification, illustrate embodiments consistent with the present disclosure, and together with the description serve to explain principles of the present disclosure. Obviously, the drawings in the following description are just illustrating some embodiments of the present disclosure. For those of ordinary skill in the art, other drawings can be obtained based on these drawings without creative efforts.

DETAILED DESCRIPTION

Figure 1A:
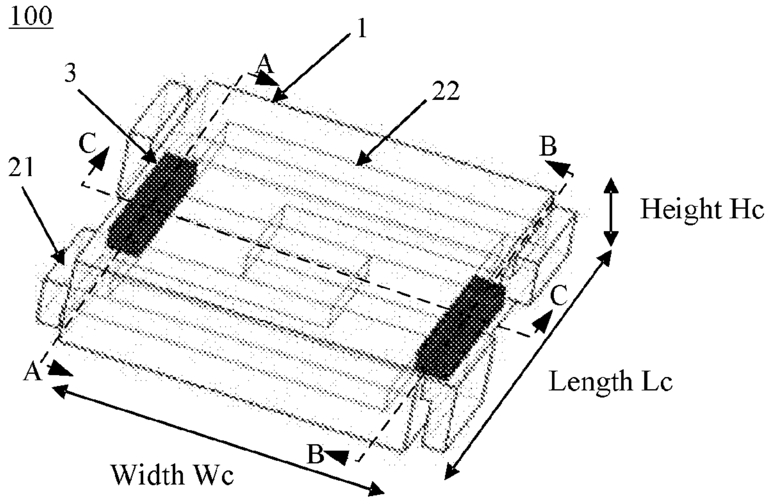
FIG. 1*a* is a schematic perspective diagram of a coupled inductor in Embodiment 1 of the present disclosure.

Example embodiments will now be described more fully with reference to the accompanying drawings. However, the example embodiments can be implemented in various forms and should not be construed as limited to the embodiments set forth herein; rather, these embodiments are provided so that the present disclosure will be comprehensive and complete, and the concept of the example embodiments will be fully conveyed to those skilled in the art. The same reference numerals in the drawings denote the same or similar structures, and thus their detailed descriptions may be omitted.

Although relative terms such as "up" and "down" are used in this specification to describe the relative relationship between one component and another component as shown, these terms are used in this specification for convenience only, for example, according to the directions of the examples described in the drawings. It can be understood that if the device as shown is turned upside down, a component which is "on" another component as described will become a component which is "under" another component. When a structure is "on" another structure, it may mean that a structure is integrally formed on another structure, or that a structure is "directly" arranged on another structure, or that a structure is "indirectly" arranged on another structure through another structure. Terms "a", "the" and "at least one" are used to indicate the presence of one or more elements/components/etc.; terms "including" and "having" are used to indicate open-ended inclusion and mean that there may be additional elements components/etc. in addition to listed elements/components/etc; terms "first", "second", and "third" are used only as markers, not as a limitation on the number of objects.

In order to solve the problems of large leakage inductance and poor coupling of a coupled inductor in the prior art without adversely affecting the saturation current and volume of the coupled inductor, the present disclosure provides a coupled inductor and a power module. By providing an adjustment structure with low magnetic permeability around a non-stacked windings and changing size of the adjustment structure, leakage inductance on a leakage magnetic flux path can be adjusted, and the coupled inductor may have a stronger coupling strength, a larger saturation current, and smaller volume at the same time.

Embodiment 1

Figure 1B:
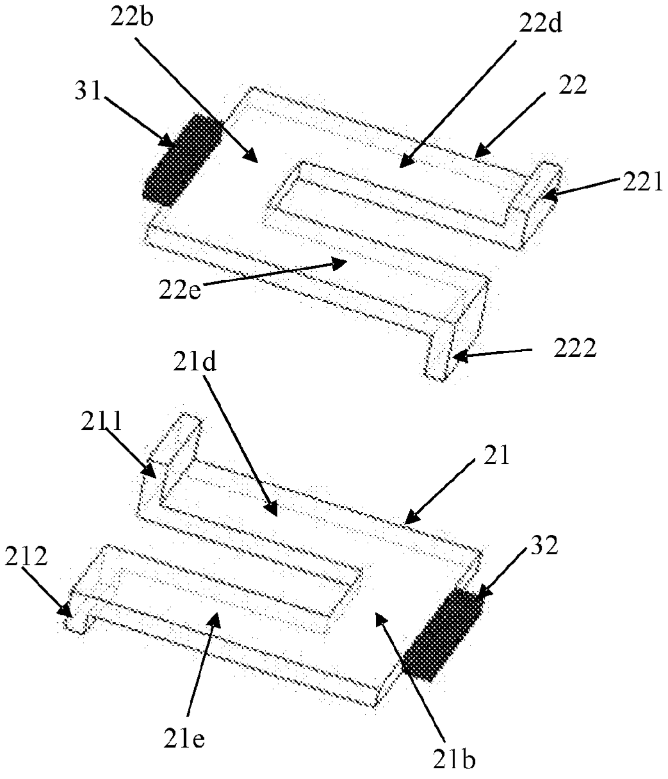
FIG. 1*b* is an exploded view of the coupled inductor in FIG. 1*a*, showing windings and adjustment structures.
Figure 1C:
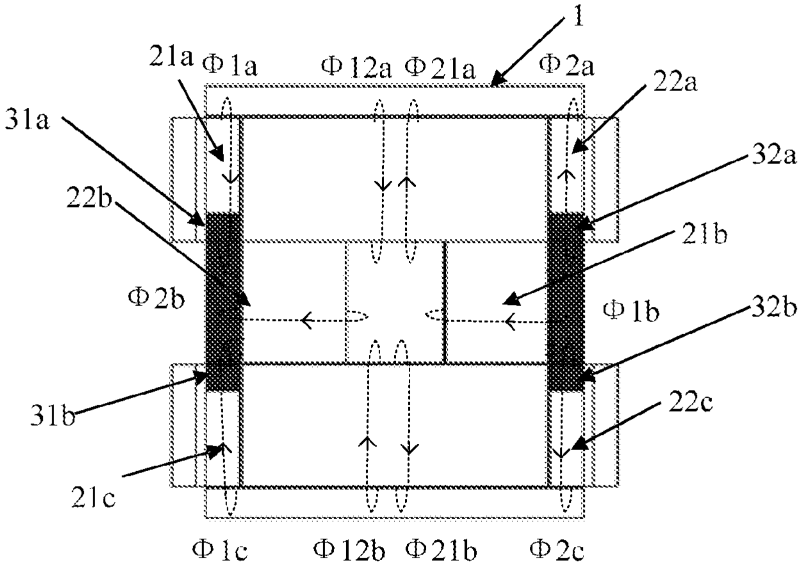
FIG. 1*c* is a top view of the coupled inductor in FIG. 1*a*, showing magnetic flux distribution of the coupled inductor.
Figure 1D:
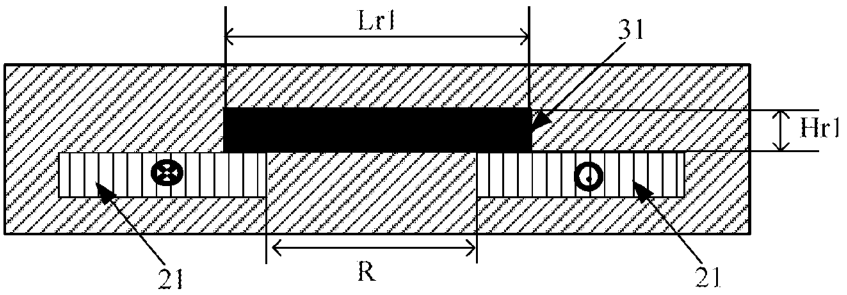
FIG. 1*d* is a cross-sectional view of the coupled inductor taken along line A-A in FIG. 1*a;*
Figure 1E:
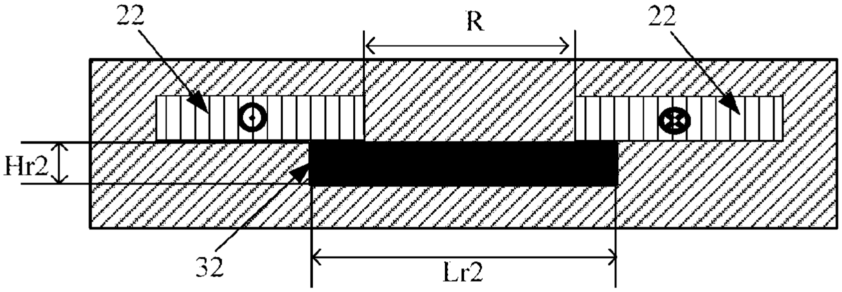
FIG. 1*e* is a cross-sectional view of the coupled inductor taken along line B-B in FIG. 1*a:*
Figure 1F:
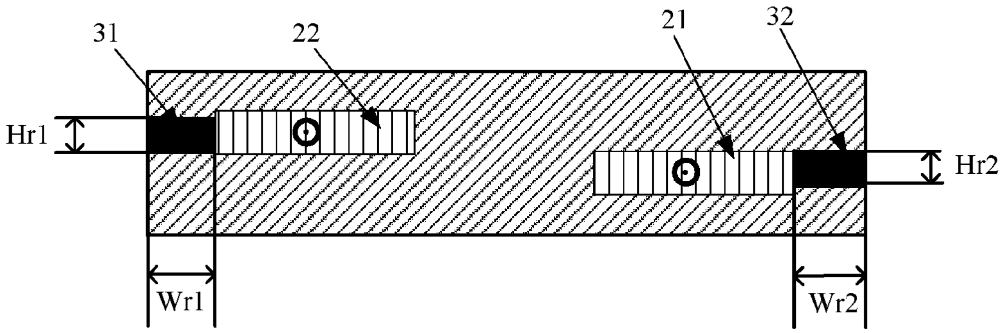
FIG. 1*f* is a cross-sectional view of the coupled inductor taken along line C-C in FIG. 1*a:*
Figure 1G:
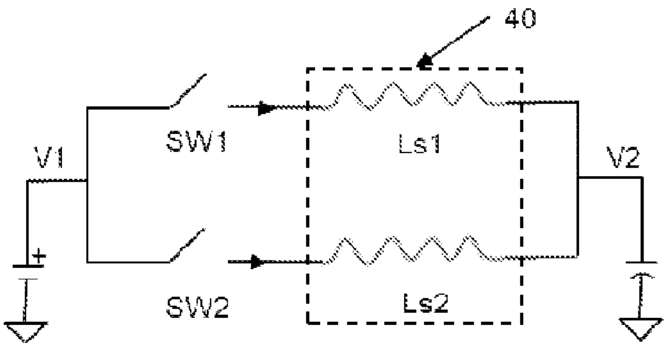
FIG. 1*g* is a schematic diagram of an application circuit of the coupled inductor in FIG. 1*a;*
Figure 1H:
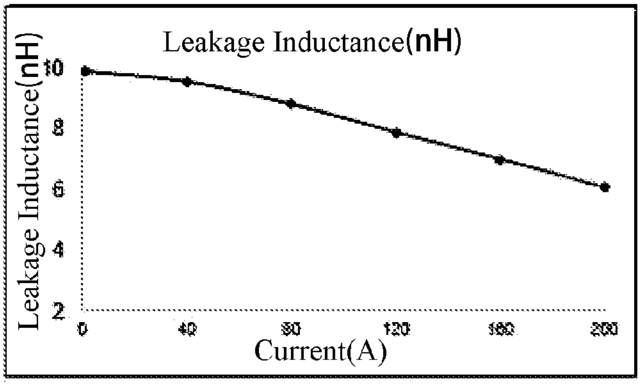
FIG. 1*h* is a graph showing a relationship between leakage inductance and current of the coupled inductor in FIG. 1*a;*

FIG. 1*a* is a schematic perspective diagram of a coupled inductor in Embodiment 1 of the present disclosure; FIG. 1*b* is an exploded view of the coupled inductor in FIG. 1*a*, showing windings and an adjustment structure; FIG. 1*c* is a top view of the coupled inductor in FIG. 1*a*, showing magnetic flux distribution of the coupled inductor; FIG. 1*d* is a cross-sectional view of the coupled inductor taken along line A-A in FIG. 1*a*; FIG. 1*e* is a cross-sectional view of the coupled inductor taken along line B-B in FIG. 1*a*; FIG. 1*f* is a cross-sectional view of the coupled inductor taken along line C-C in FIG. 1*a*; FIG. 1*g* is a schematic diagram of an application circuit of the coupled inductor in FIG. 1*a*; FIG. 1*h* is a graph showing a relationship between leakage inductance and current of the coupled inductor in FIG. 1*a*.

As shown in FIGS. 1*a*-1*c*, a coupled inductor 100 includes a magnetic core 1, a first winding 21, a second winding 22, and an adjustment structure 3. At least part of the first winding 21 and at least part of the second winding 22 are located in the magnetic core 1. A stacked portion of the first winding 21 and a stacked portion of the second winding 22 are stacked in a height direction, a non-stacked portion of the first winding 21 and the second winding 22 are not stacked in the height direction, and a non-stacked portion of the second winding 22 and the first winding 21 are not stacked in the height direction. The adjustment structure 3 is located in the magnetic core 1, the adjustment structure 3 is adjoining the non-stacking portion of the first winding 21 and the non-stacked portion of the second winding 22, and a magnetic permeability of the adjustment structure 3 is less than a magnetic permeability of the magnetic core 1. Since there is leakage magnetic flux around the non-stacked portions of the first winding 21 and the second winding 22, by providing an adjustment structure with a low magnetic permeability at the leakage magnetic flux path around the non-stacked portions, it can effectively adjust a magnitude of the leakage magnetic flux, thereby adjusting the leakage inductance.

The coupled inductor 100 has a length Lc, a width Wc, and a height Hc. The width We refers to a maximum perpendicular distance between a first side and a second side of the coupled inductor 100, the length Lc refers to a maximum perpendicular distance between a third side and a fourth side of the coupled inductor 100, and the height Hc refers to a maximum perpendicular distance between a top surface and a bottom surface of the coupled inductor 100. A length direction refers to a direction extending along the length Lc, a width direction refers to a direction extending along the width Wc, and a height direction refers to a direction extending along the height Hc. The "adjoining" means adjacent and touching.

In this embodiment, the magnetic core 1 includes an iron powder, an alloy powder, an amorphous powder, or a nanocrystalline powder that are covered with an insulating layer, the first winding 21 and the second winding 22 are embedded in the magnetic core 1, the adjustment structure 3 is embedded in the magnetic core 1, and the coupled inductor 100 is integrally formed by molding process. In one embodiment, the leakage inductance of the coupled inductor 100 with the powder core may be adjusted via a combination of distributed air gap of the powder core and the adjustment structure 3. The magnetic core which is made of the magnetic powder with low magnetic permeability may facilitate realization of the adjustment structure 3 in molding process. The stacked portion of the first winding 21 and the stacked portion of the second winding 22 are in contact with each other through an insulating layer, which is used for electrical isolation between the first winding 21 and the second winding 22. In one embodiment, the stack portions of the first winding 21 and the second winding 22 is in close contact with each other only through the insulating layer, and no magnetic material is included there between, so that a distance between the two windings may be very small, for example, less than 200 um. In this way, a magnetic flux between the stacked portions of the two windings has a strong coupling intensity. The stacked portion of the first winding 21 and the stacked portion of the second winding 22 and the adjustment structure 3 are not stacked in the height direction, so that the height of the coupled inductor may be smaller while having a leakage inductance adjustment function, and there would be no adverse effect for the size of the magnetic core or the area of the windings. The adjustment structure 3 includes air, insulating glue or magnetic material. Specifically, the adjustment structure 3 may be air gap or other non-magnetic insulating materials, such as epoxy resin with relative magnetic permeability being approximately equal to 1. Further, the adjustment structure may also be a magnetic material having a certain magnetic permeability, but the magnetic permeability of the adjustment structure 3 should be lower than the magnetic permeability of the magnetic core 1.

As shown in FIGS. 1*a*-1*c*, the first winding 21 and the second winding 22 extend from a first end thereof to a second end thereof and surround an axis in the height direction in opposite directions respectively. Specifically, the first winding 21 extends from a first end 211 of the first winding 21 to a second end 212 of the first winding 21 clockwise around an axis (not shown in the figure) along the height direction, and the second winding 22 extends from the first end 221 of the second winding 22 to the second end 222 of the second winding 22 around the axis in a counter-clockwise direction. A space enclosed by the two windings forms a rectangular parallelepiped window. A number of turns of the first winding 21 may be one, and a number of turns of the second winding 22 may be one. The first winding 21 may include a single-stranded wire, a multi-stranded wire, or a sheet metal piece, and the second winding 22 may include a single-stranded wire, a multi-stranded wire, or a sheet metal piece. In one embodiment, the first winding 21 and the second winding 22 may both be U-shaped, a U-shaped winding includes three linear portions connected perpendicularly to each other in sequence, two linear portions on both sides are parallel to each other, the length may be equal, and a length of linear portion on a bottom side can be slightly shorter. However, in other embodiments, the number of turns of the first winding 21 and the second winding 22 may be multiple turns, and the shape of the first winding 21 or the second winding 22 is not limited to U-shaped. In some embodiments, the first winding 21 and the second winding 22 may be C-shaped or the like. The first end 211 and the second end 212 of the first winding 21 protrude from a first side of the magnetic core 1, the first end 221 and the second end 222 of the second winding 22 protrude from a second side of the magnetic core 1, and the first side is opposite to the second side. The first end 211 of the first winding 21 and the first end 221 of the second winding 22 are bent upward in the height direction, and the second end 212 of the first winding 21 and the second end 222 of the second winding 22 are bent downward in the height direction. In other embodiments, ends of the windings can be protruded in other directions.

In combination with FIG. 1*g*, the coupled inductor 100 is used as an inductor 40 in a power module, and the first winding 21 and the second winding 22 are used as an inductor Ls1 and an inductor Ls2, respectively. The first end 211 of the first winding 21 is used as an input end to electrically connect to a first switch circuit SW1, the first end 221 of the second winding 22 is used as an input end to electrically connect to a second switch circuit SW2, and a second end 212 of the first winding 21 and a second end 222 of the second winding 22 are used as output ends to electrically connect to an access end V2 of an external load. In the embodiment, the configuration of the lead-out of the ends can facilitate disposing a switch circuit on a coupled inductor and disposing an external load under the coupled inductor, wherein the switch circuit is configured to connect an input end of the coupled inductor, the external load is configured to connected to an output end of the coupled inductor, so that the switch circuit as a heat source can be disposed on the top of the module and directly connected to a heat sink, thereby facilitating heat dissipation of the power module. In addition, when a first current flows in via the first end 211 of the first winding 21 and flows out from the second end 212 of the first winding 21, and a second current flows in via the first end 221 of the second winding 22 and flows out from the second end 222 of the second winding 22, a magnetic flux generated by the first current in the stacked portion of the first winding 21 can be at least partially offset by a magnetic flux generated by the second current in the stacked portion of the second winding 22. There is an inverse coupling relationship between the first winding 21 and the second winding 22, the first end 211 of the first winding 21 and the first end 221 of the second winding 22 are opposite polarity ends, and the coupled inductor 100 includes two inverse coupled windings. The so-called opposite polarity ends means that when current flows in via both ends which are opposite polarity ends, the magnetic fluxes in the magnetic core are offset by each other. The adjustment structure 3 is adjoining the non-stacked portion of the first winding 21 and the non-stacked portion of the second winding 22, and the magnetic flux generated by the first current in the non-stacked portion of the first winding 21 and the magnetic flux generated by the second current in the non-stacked portion of the second winding 22 may be effectively adjusted. Flexible adjustment of the leakage inductance and coupling strength of the coupled inductor can improve the efficiency and dynamic performance of the power module.

As shown in FIGS. 1*a*-1*c*, the stacked portion of the first winding 21 includes a first stacked portion 21*d* and a second stacked portion 21*e*, the non-stacked portion of the first winding 21 includes a first non-stacked portion 21*a*, a second non-stacked portion 21*b*, and a third non-stacked portion 21*c*, and the first non-stacked portion 21*a*, the first stacked portion 21*d*, the second non-stacked portion 21*b*, the second stacked portion 21*e*, and the third non-stacked portion 21*c* of the first winding 21 are connected in sequence from the first end 211 to the second end 212. The stacked portion of the second winding 22 includes a first stacked portion 22*d* and a second stacked portion 22*e*, the non-stacked portion of the second winding includes a first non-stacked portion 22*a*, a second non-stacked portion 22*b*, and a third non-stacked portion 22*c*, and the first non-stacked portion 22*a*, the first stacked portion 22*d*, the second non-stacked portion 22*b*, the second stacked portion 22*e*, and the third non-stacked portion 22*c* of the second windings 22 are in sequence connected from the first end 221 to the second end 222. A contact surface between the first winding 21 and the second winding 22 are located on a horizontal plane (not shown). The adjustment structure 3 includes a first adjustment structure 31 and a second adjustment structure 32. The first adjustment structure 31 is adjoining the first non-stacked portion 21*a* of the first winding 21, the third non-stacked portion 21*c* of the first winding 21, and the second non-stacked portion 22*b* of the second winding 22, and the first adjustment structure 31 extends from the horizontal plane in a direction away from the first winding 21. The second adjustment structure 32 is adjoining the first non-stacked portion 22*a* of the second winding 22, the third non-stacked portion 22*c* of the second winding 22, and the second non-stacked portion 21*b* of the first winding 21, and the second adjustment structure 32 extends from the horizontal plane in a direction away from the second winding 22.

In combination with FIG. 1*g*, when the coupled inductor 100 works, current flows in via the first end 211 of the first winding 21 and the first end 221 of the second winding 22 and flows out from the second end 212 of the first winding 21 and the second end 222 of the second winding 22, as shown in FIG. 1*c*, the first non-stacked portion 21*a*, the second non-stacked portion 21*b*, and the third non-stacked portion 21*c* of the first winding 21 generate leakage magnetic fluxes Φ1*a*, Φ1*b*, and Φ1*c* in the magnetic core 1, respectively; the first stacked portion 21*d* and the second stacked portion 21*e* of the first winding 21 generate main magnetic fluxes Φ12*a* and Φ12*b*, respectively; the first non-stacked portion 22*a*, the second non-stacked portion 22*b*, and the third non-stacked portion 22*c* of the second winding 22 generate leakage magnetic fluxes Φ2*a*, Φ2*b*, and Φ2*c* in the magnetic core 1, respectively; the first stacked portion 22*d* and the second stacked portion 22*e* of the second winding 22 generate main magnetic fluxes Φ21*a* and Φ21*b*, respectively. Here, the leakage magnetic flux refers to the magnetic flux generated by a winding and not coupled to another winding, and the main magnetic flux refers to the magnetic flux generated by a winding and coupled to another winding. The main magnetic flux Φ12*a* of the first winding 21 and the main magnetic flux Φ21*a* of the second winding 22 are in opposite directions and at least partially offset by each other. The main magnetic flux Φ12*b* of the first winding 21 and the main magnetic flux Φ21*b* of the second winding 22 are in opposite directions and at least partially offset by each other. In addition, the first adjustment structure 31 is adjoining the first non-stacked portion 21*a* of the first winding 21, the third non-stacked portion 21*c* of the first winding 21, and the second non-stacked portion 22*b* of the second winding 22. That is, the first adjustment structure 31 is located on a path where the leakage magnetic fluxes Φ1*a*, Φ1*c*, and Φ2*b* are located, so as to achieve the adjustment of the leakage magnetic fluxes Φ1*a*, Φ1*c*, and Φ2*b*. The second adjustment structure 32 is adjoining the first non-stacked portion 22*a* of the second winding 22, the third non-stacked portion 22*c* of the second winding 22, and the second non-stacked portion 21*b* of the first winding 21. That is, the second adjustment structure 32 is located on a path where the leakage magnetic fluxes Φ2*a*, Φ2*c*, and Φ1*b* are located, so as to achieve the adjustment of the leakage magnetic fluxes Φ2*a*, Φ2*c*, and Φ1*b*.

As shown in FIGS. 1*d*-1*f*, the first adjustment structure 31 has a length Lr1, a width Wr1, and a height Hr1, and the second adjustment structure 32 has a length Lr2, a width Wr2, and a height Hr2. The window enclosed by the first winding 21 and the second winding 22 has a length R. A first sub-portion 31*a* of the first adjustment structure 31 and the first non-stacked portion 21*a* of the first winding 21 are stacked in the height direction, a second sub-portion 31*b* of the first adjustment structure 31 and the third non-stacked portion 21*c* of the first winding 21 are stacked in the height direction, a length of the first sub-portion 31*a* of the first adjustment structure 31 is greater than or equal to the height Hr1 of the first adjustment structure 31, and a length of the second sub-portion 31*b* of the first adjustment structure 31 is greater than or equal to the height Hr1 of the first adjustment structure 31. That is, the first adjustment structure 31 straddles upper surfaces of the first non-stacked portion 21*a* and the third non-stacked portion 21*c* of the first winding 21, and $Lr1 \geq R+2*Hr1$. The first adjustment structure 31 is adjoining the first side of the magnetic core, and the first adjustment structure 31 is located between the first side and the second non-stacked portion 22*b* of the second winding 22. That is, the first adjustment structure 31 extends from the second non-stacked portion 22*b* of the second winding 22 to the first side of the magnetic core. The height Hr1 of the first adjustment structure 31 is less than or equal to the height of the second winding 22. Accordingly, a first sub-portion 32*a* of the second adjustment structure 32 and the first non-stacked portion 22*a* of the second winding 22 are stacked in the height direction, a second sub-portion 32*b* of the second adjustment structure 32 and the third non-stacked portion 22*c* of the second winding 22 are stacked in the height direction, a length of the first sub-portion 32*a* of the second adjustment structure 32 is greater than or equal to the height Hr2 of the second adjustment structure 32, and a length of the second sub-portion 32*b* of the second adjustment structure 32 is greater than or equal to the height Hr2 of the second adjustment structure 32. That is, the second adjustment structure 32 straddles lower surfaces of the first non-stacked portion 22*a* and the third non-stacked portion 22*c* of the second winding 22, and $Lr2 \geq R+2*Hr2$. The second adjustment structure 32 is adjoining the second side of the magnetic core opposite to the first side, and the second adjustment structure 32 is located between the second side and the second non-stacked portion 21*b* of the first winding 21. That is, the second adjustment structure 32 extends from the second non-stacked portion 21*b* of the first winding 21 to the second side of the magnetic core. The height Hr2 of the second adjustment structure 32 is less than or equal to the height of the first winding 21.

Within the above size range, the adjustment of the leakage inductance can be achieved by adjusting at least one of the length and height of the first adjustment structure 31 and the second adjustment structure 32. For example, the larger the height, the smaller the leakage inductance; the smaller the height, the larger the leakage inductance. Typically, configurations and sizes of the first adjustment structure 31 and the second adjustment structure 32 may be same, so that the leakage inductances of the first winding 21 and the second winding 22 are relatively close. However, it should be noted that, in other embodiments, for some special needs, the configurations and sizes of the first adjustment structure 31 and the second adjustment structure 32 may also be different. The leakage inductances can also be adjusted by adjusting the widths of the first adjustment structure 31 and the second adjustment structure 32. In addition, the configurations and sizes of the first adjustment structure 31 and the second adjustment structure 32 may be different from those of the embodiment. However, different configurations and sizes will have different leakage inductance adjustment effects. According to the above embodiments, better leakage inductance adjustment effects can be achieved.

In combination with FIG. 1*h*, when initial leakage inductance of the coupled inductor 100 is adjusted to about 10 nH required by a high-frequency VRM, a current is 160A when the initial leakage inductance is attenuated by about 30%. That is, the saturation current of the leakage inductance of the coupled inductor is about 160A, which can meet the requirements of existing high-frequency switch devices that peak current which is more than 100A can be allowed. In the coupled inductor 100 of this embodiment, an adjustment structure with a low magnetic permeability is provided around the non-stacked windings, and a size of the adjustment structure is changed to adjust the leakage inductance on a leakage magnetic flux path so that efficiency of the power module and dynamic performance can be balanced; meanwhile, the coupled inductor has a stronger coupling strength, a larger saturation current and a smaller volume.

Embodiment 2

Figure 2A:
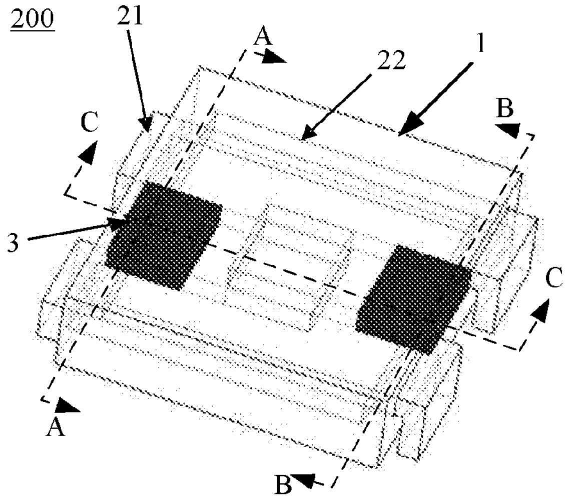
FIG. 2*a* is a schematic perspective diagram of a coupled inductor in Embodiment 2 of the present disclosure.
Figure 2B:
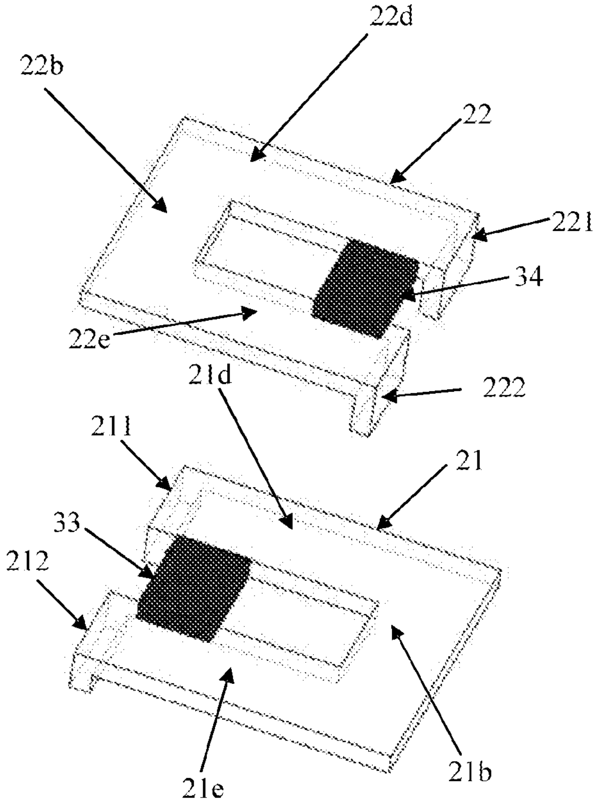
FIG. 2*b* is an exploded view of the coupled inductor in FIG. 2*a*, showing windings and adjustment structures.
Figure 2C:
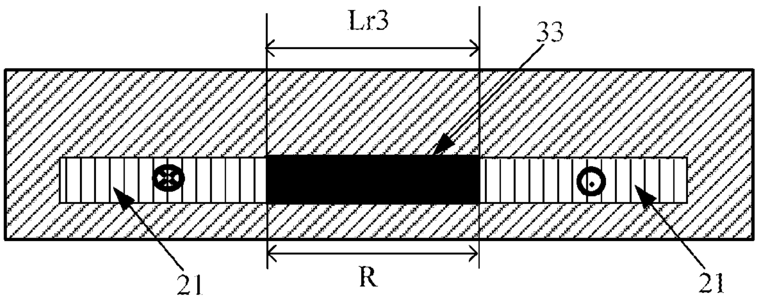
FIG. 2*c* is a cross-sectional view of the coupled inductor taken along line A-A in FIG. 2*a;*
Figure 2D:
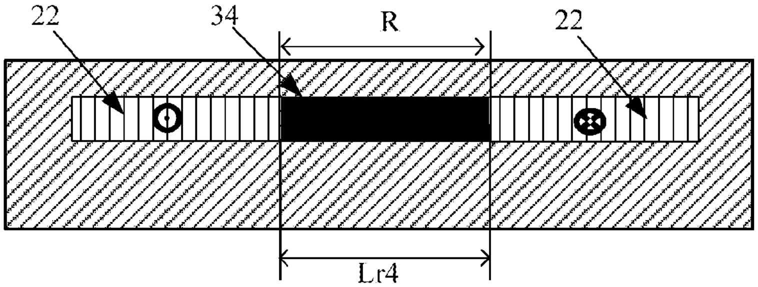
FIG. 2*d* is a cross-sectional view of the coupled inductor taken along line B-B in FIG. 2*a:*
Figure 2E:
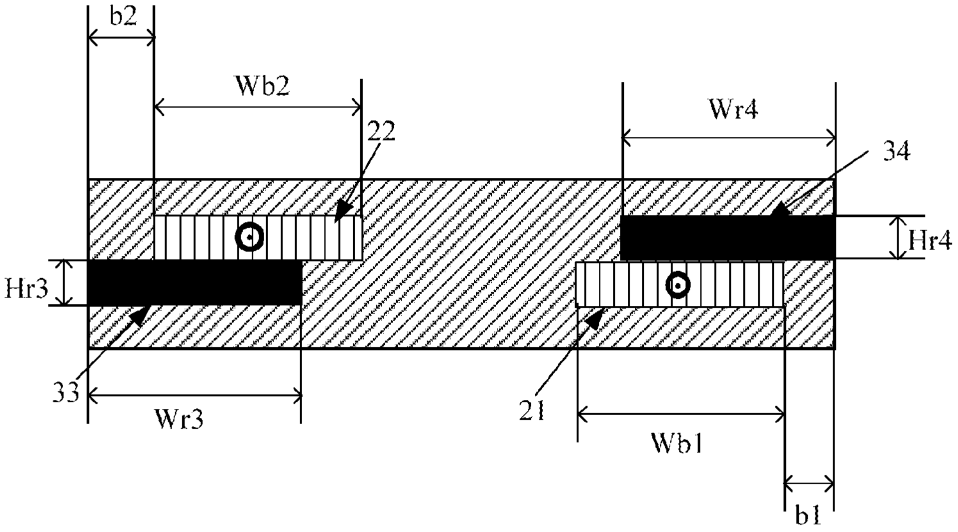
FIG. 2*e* is a cross-sectional view of the coupled inductor taken along line C-C in FIG. 2*a:*

FIG. 2*a* is a schematic perspective diagram of a coupled inductor in Embodiment 2 of the present disclosure. FIG. 2*b* is an exploded view of the coupled inductor in FIG. 2*a*, showing windings and an adjustment structure. FIG. 2*c* is a cross-sectional view of the coupled inductor taken along line A-A in FIG. 2*a*. FIG. 2*d* is a cross-sectional view of the coupled inductor taken along line B-B in FIG. 2*a*. FIG. 2*e* is a cross-sectional view of the coupled inductor taken along line C-C in FIG. 2*a*.

As shown in FIGS. 2*a* and 2*b*, a coupled inductor 200 has a similar structure to the coupled inductor 100 in the Embodiment 1, and a difference therebetween is that position of an adjustment structure 3 and lead-out method of ends of windings are different from those in the Embodiment 1. Specifically, the adjustment structure 3 includes a third adjustment structure 33 and a fourth adjustment structure 34. The third adjustment structure 33 is adjoining the first non-stacked portion of the first winding 21, the third non-stacked portion of the first winding 21 and the second non-stacked portion 22*b* of the second winding 22, and the third adjustment structure 33 extends from a horizontal plane in a direction away from the second winding 22. The fourth adjustment structure 34 is adjoining the first non-stacked portion of the second winding 22, the third non-stacked portion of the second winding 22 and the second non-stacked portion 21*b* of the first winding 21, and the fourth adjustment structure 34 extends from the horizontal plane in the direction away from the first winding 21. The first end of the first winding 21, the second end of the first winding 21, the first end of the second winding 22, and the second end of the second winding 22 are bent downward in the height direction. Compared to the lead-out method of ends in the Embodiment 1, the ends of the first winding and the second winding are bent in a same direction, and pads of the coupled inductor 200 may be disposed on a same side.

In combination with FIGS. 2*c*-2*e*, the third adjustment structure 33 has a length Lr3, a width Wr3, and a height Hr3, and the fourth adjustment structure 34 has a length Lr4, a width Wr4, and a height Hr4. The second non-stacked portion 21*b* of the first winding 21 has a width Wb1, and the second non-stacked portion 22*b* of the second winding 22 has a width Wb2. A minimum distance from the first winding 21 to the second side of the magnetic core 1 is b1, and a minimum distance from the second winding 22 to the first side of the magnetic core 1 is b2. The third adjustment structure 33 is located between the first non-stacked portion 21*a* of the first winding 21 and the third non-stacked portion 21*c* of the first winding 21. In the embodiment, the third adjustment structure 33 contacts with two opposite surfaces of the first non-stacked portion 21*a* and the third non-stacked portion 21*c* of the first winding 21, and Lr3=R. In one embodiment, the third adjustment structure 33 is sandwiched between the first non-stacked portion 21*a* and the third non-stacked portion 21*c* of the first winding 21. The third adjustment structure 33 is adjoining the first side of the magnetic core 1, the first sub-portion of the third adjustment structure 33 and the second non-stacked portion 22*b* of the second winding 22 are stacked in the height direction, and the width of the first sub-portion of the third adjustment structure 33 is greater than or equal to the height of the third adjustment structure 33 and less than or equal to the width of the second non-stacked portion 22*b* of the second winding 22. That is, the third adjustment structure 33 is stacked on a lower surface of the second non-stacked portion 22*b* of the second winding 22, and $b2+Hr3 \le Wr3 \le b2+Wb2$. The height Hr3 of the third adjustment structure 33 is less than or equal to the height of the first winding 21. Accordingly, the fourth adjustment structure 34 is located between the first non-stacked portion 22*a* of the second winding 22 and the third non-stacked portion 22 c of the second winding 22. In the embodiment, the fourth adjustment structure 34 contacts with the two opposite surfaces of the first non-stacked portion 22*a* and the third non-stacked portion 22*c* of the second winding 22, and Lr4=R. In one embodiment, the fourth adjustment structure 34 is sandwiched between the first non-stacked portion 22*a* and the third non-stacked portion 22*c* of the second winding 22. The fourth adjustment structure 34 is adjoining the second side of the magnetic core 1 opposite to the first side, the first sub-portion of the fourth adjustment structure 34 and the second non-stacked portion 21*b* of the first winding 21 are stacked in the height direction, and the width of the first sub-portion of the fourth adjustment structure 34 is greater than or equal to the height of the fourth adjustment structure 34 and less than or equal to the width of the second non-stacked portion 21*b* of the first winding 21. That is, the fourth adjustment structure 34 is stacked on the upper surface of the second non-stacked portion 21*b* of the first winding 21, and $b1 \div Hr4 \le Wr4 \le b1+Wb1$. The height Hr4 of the fourth adjustment structure 34 is less than or equal to the height of the second winding 22.

Within the above-mentioned size range, the leakage inductance may be adjusted via adjusting at least one of the widths and heights of the third adjustment structure 33 and the fourth adjustment structure 34. For example, the larger the height, the smaller the leakage inductance; the smaller the height, the larger the leakage inductance. In other embodiments, the positions and sizes of the third adjustment structure 33 and the fourth adjustment structure 34 may be different from those in this embodiment. However, different positions and sizes will correspond to different leakage inductance adjustment effects. According to the above embodiments, advantageous leakage inductance adjustment effects may be achieved. In the embodiment, it should be noted that the third adjustment structure 33 is also adjoining the first non-stacked portion 21*a* of the first winding 21, the third non-stacked portion 21*c* of the first winding 21, and the second non-stacked portion 22*b* of the second winding 22 simultaneously so as to achieve adjustment of the leakage magnetic fluxes Φ1*a*, Φ1*c*, and Φ2*b*, and the fourth adjustment structure 34 is also adjoining the first non-stacked portion 22*a* of the second winding 22, the third non-stacked portion 22*c* of the second winding 22, and the second non-stacked portion 21*b* of the first winding 21 simultaneously so as to achieve adjustment of the leakage magnetic fluxes Φ2*a*, Φ2*c*, and Φ1*b* although the positions and sizes of the third adjustment structure 33 and the fourth adjustment structure 34 are different from those of the first adjustment structure 31 and the second adjustment structure 32 in the first embodiment. Other same features are not repeated here.

Embodiment 3

Figure 3A:
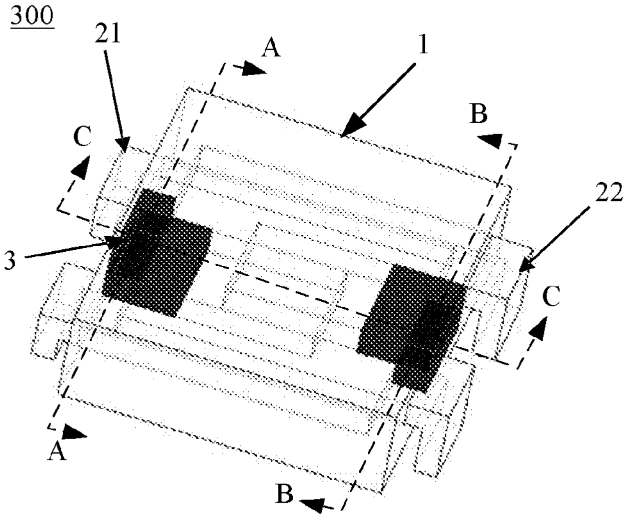
FIG. 3*a* is a schematic perspective diagram of a coupled inductor in Embodiment 3 of the present disclosure.
Figure 3B:
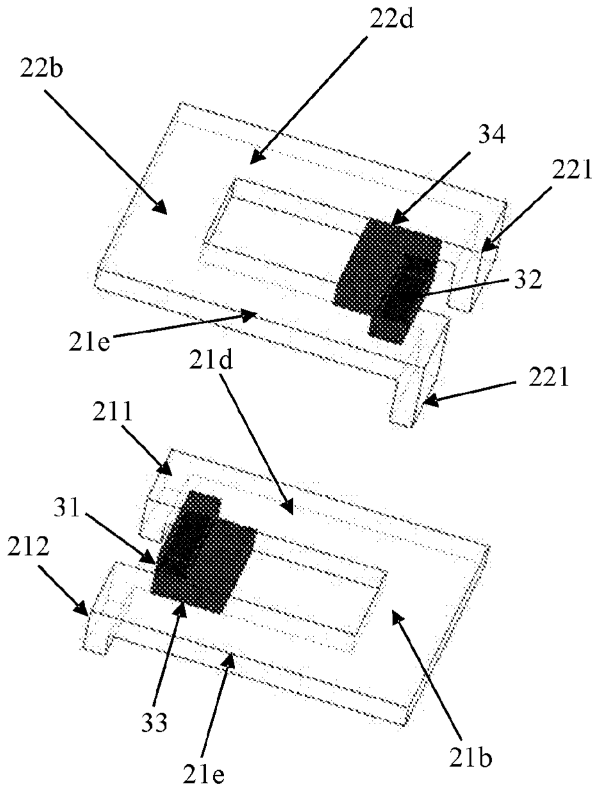
FIG. 3*b* is an exploded view of the coupled inductor in FIG. 3*a*, showing windings and adjustment structures.
Figure 3C:
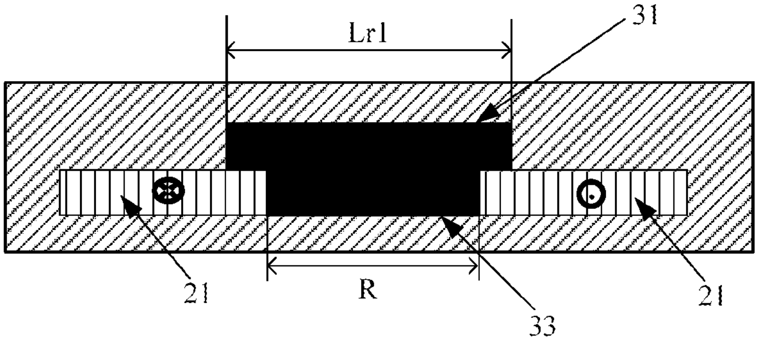
FIG. 3*c* is a cross-sectional view of the coupled inductor taken along line A-A in FIG. 3*a:*
Figure 3D:
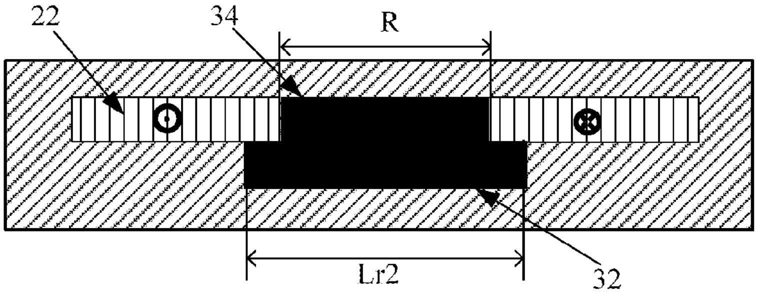
FIG. 3*d* is a cross-sectional view of the coupled inductor taken along line B-B in FIG. 3*a;*
Figure 3E:
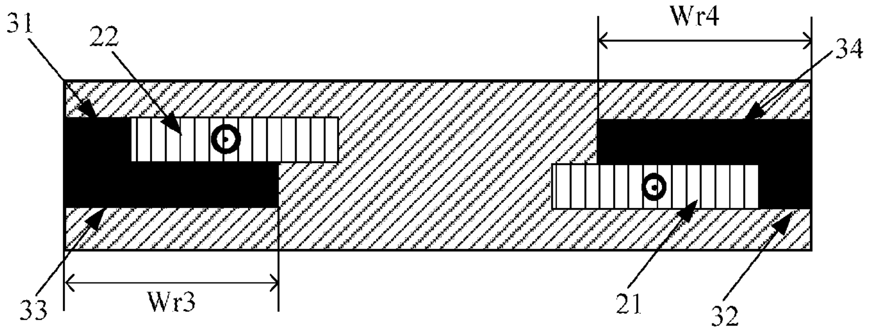
FIG. 3*e* is a cross-sectional view of the coupled inductor taken along line C-C in FIG. 3*a:*

FIG. 3*a* is a schematic perspective diagram of a coupled inductor in Embodiment 3 of the present disclosure; FIG. 3*b* is an exploded view of the coupled inductor in FIG. 3*a*, showing windings and adjustment structures; FIG. 3*c* is a cross-sectional view of the coupled inductor taken along line A-A in FIG. 3*a*; FIG. 3*d* 3B is a cross-sectional view of the coupled inductor taken along line B-B in FIG. 3*a*; FIG. 3*e* is a cross-sectional view of the coupled inductor taken along line C-C in FIG. 3*a*.

As shown in FIGS. 3*a*-3*b*, a coupled inductor 300 has a similar structure to the coupled inductor 200 in the Embodiment 2, but a difference therebetween is that the adjustment structure 3 in the coupled inductor 300 includes not only a third adjustment structure 33 and a fourth adjustment structure 34, but also the first adjustment structure 31 and the second adjustment structure 32.

As shown in FIGS. 3*c*-3*e*, the first adjustment structure 31 in the coupled inductor 300 is same as the first adjustment structure 31 in the coupled inductor 100, and the second adjustment structure 32 in the coupled inductor 300 is same as and the second adjustment structure 32 in the coupled inductor 100. The third adjustment structure 33 in the coupled inductor 300 has a same structure as the third adjustment structure 33 in the coupled inductor 200, and the fourth adjustment structure 34 in the coupled inductor 300 has a same structure as the fourth adjustment structure 34 in the coupled inductor 200, which are not repeated here.

Embodiment 4

Figure 4A:
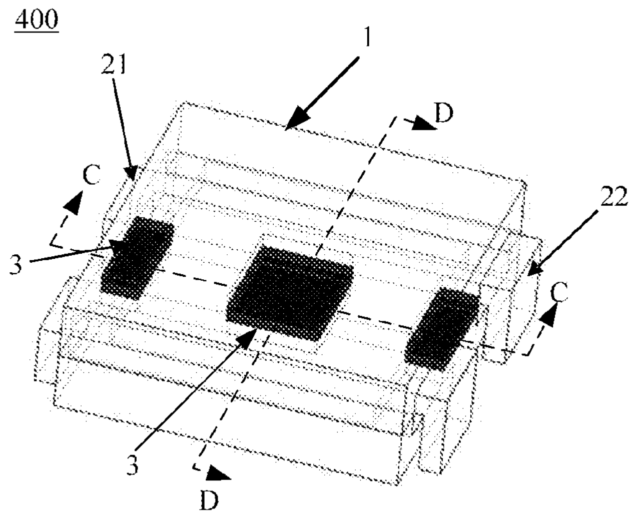
FIG. 4*a* is a schematic perspective diagram of a coupled inductor in Embodiment 4 of the present disclosure.
Figure 4B:
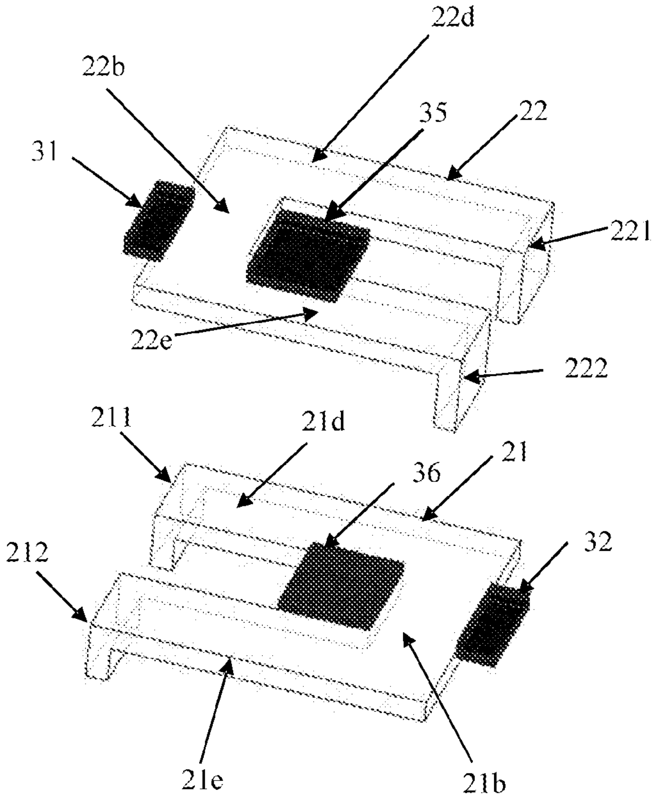
FIG. 4*b* is an exploded view of the coupled inductor in FIG. 4*a*, showing windings and adjustment structures.
Figure 4C:
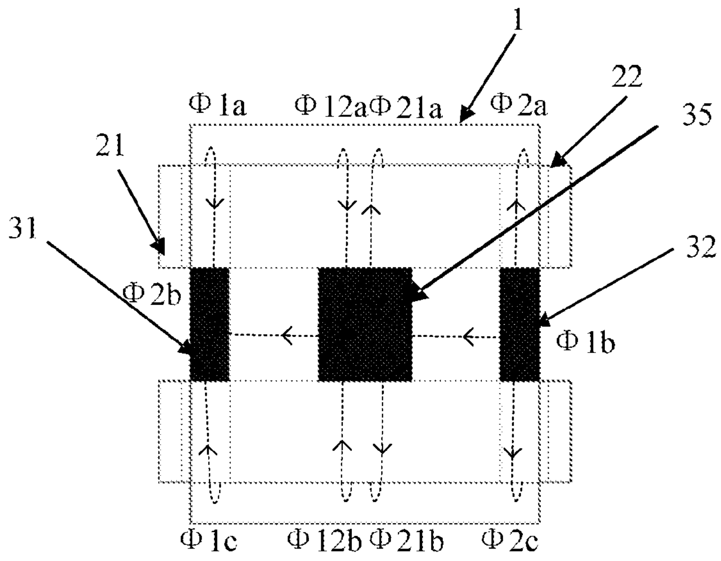
FIG. 4*c* is a top view of the coupled inductor in FIG. 4*a*, showing magnetic flux distribution of the coupled inductor.
Figure 4D:
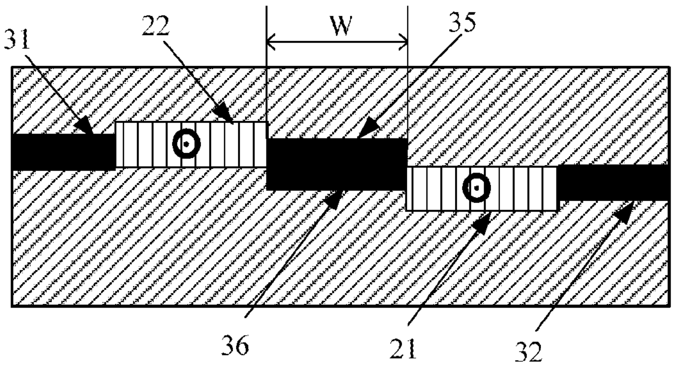
FIG. 4*d* is a cross-sectional view of the coupled inductor taken along line C-C in FIG. 4*a:*
Figure 4E:
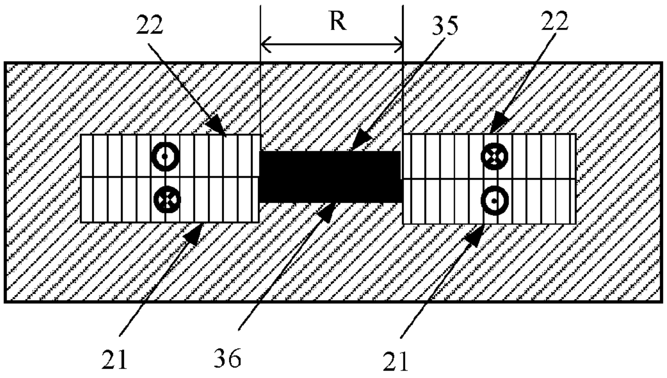
FIG. 4*e* is a cross-sectional view of the coupled inductor taken along line D-D in FIG. 4*a:*

FIG. 4*a* is a schematic perspective diagram of a coupled inductor in Embodiment 4 of the present disclosure; FIG. 4*b* is an exploded view of the coupled inductor in FIG. 4*a*, showing windings and adjustment structures; FIG. 4*c* is a top view of the coupled inductor in FIG. 4*a*, showing magnetic flux distribution of the coupled inductor; FIG. 4*d* is a cross-sectional view of the coupled inductor taken along line C-C in FIG. 4*a*; FIG. 4*e* is a cross-sectional view of the coupled inductor taken along line D-D in FIG. 4*a*.

As shown in FIGS. 4*a*-4*b*, a coupled inductor 400 is similar in structure to the coupled inductor 100 in the Embodiment 1, and a difference therebetween is that the adjustment structure 3 in the coupled inductor 400 includes not only the first adjustment structure 31 and the second adjustment structure 32, but also a fifth adjustment structure 35 and a sixth adjustment structure 36. The first adjustment structure 31 in the coupled inductor 400 is same as the first adjustment structure 31 in the coupled inductor 100, and the second adjustment structure 32 in the coupled inductor 400 is same as the second adjustment structure 32 in the coupled inductor 100, which are not repeated here.

In combination with FIG. 4*d*-4*e*, the fifth adjustment structure 35 is located between the first stacked portion 22*d* of the second winding 22 and the second stacked portion 22*e* of the second winding 22, and the fifth adjustment structure 35 is adjoining the first stacked portion 22*d* of the second winding 22 and the second stacked portion 22*e* of the second winding 22. That is, a length of the fifth adjustment structure 35 is equal to the length R of the window. The fifth adjustment structure 35 is adjoining the second non-stacked portion 21*b* of the first winding 21 and the second non-stacked portion 22*b* of the second winding 22. That is, the width of the fifth adjustment structure 35 is equal to the width W of the window. The fifth adjustment structure 35 extends in a direction away from the first winding 21 from a horizontal plane where the contact surface of the two windings is located, and the height of the fifth adjustment structure 35 is less than or equal to the height of the second winding 22. Accordingly, the sixth adjustment structure 36 is located between the first stacked portion 21*d* of the first winding 21 and the second stacked portion 21*e* of the first winding 21, and the sixth adjustment structure 36 is adjoining the first stacked portion 21*d* of the first winding 21 and the second stacked portion 21*e* of the first winding 21. That is, a length of the sixth adjustment structure 36 is equal to the length R of the window. The sixth adjustment structure 36 is adjoining the second non-stacked portion 21*b* of the first winding 21 and the second non-stacked portion 22*b* of the second winding 22. That is, the width of the sixth adjustment structure 36 is equal to the width W of the window. The sixth adjustment structure 36 extends in a direction away from the second winding 22 from the horizontal plane where the contact surface of the two windings is located, and the height of the sixth adjustment structure 36 is less than or equal to the height of the first winding 21.

Within the above size range, as shown in FIG. 4*c*, by adjusting at least one of the heights of the fifth adjustment structure 35 and the sixth adjustment structure 36, not only the leakage magnetic fluxes Φ1*b* and Φ2*b* may be effectively adjusted, but also main magnetic fluxes Φ12*a* and Φ12*b*, Φ21*a*, and Φ21*b* may be effectively adjusted. Specifically, the greater the heights of the fifth adjustment structure 35 and the sixth adjustment structure 36, the smaller the main magnetic fluxes and the weaker the coupling; the smaller the heights, the larger the main magnetic fluxes and the stronger the coupling. It should be noted that, in this embodiment, the adjustment structure 3 includes the first adjustment structure 31, the second adjustment structure 32, the fifth adjustment structure 35, and the sixth adjustment structure 36. However, in other embodiments, the adjustment structure 3 may include only the fifth adjustment structure 35 and the sixth adjustment structure 36. Also, it may include only the third adjustment structure 33, the fourth adjustment structure 34, the fifth adjustment structure 35, and the sixth adjustment structure 36. Further, it may even include only at least one of the first adjustment structure 31, the second adjustment structure 32, the third adjustment structure 33, the fourth adjustment structure 34, the fifth adjustment structure 35, and the sixth adjustment structure 36.

Embodiment 5

Figure 5A:
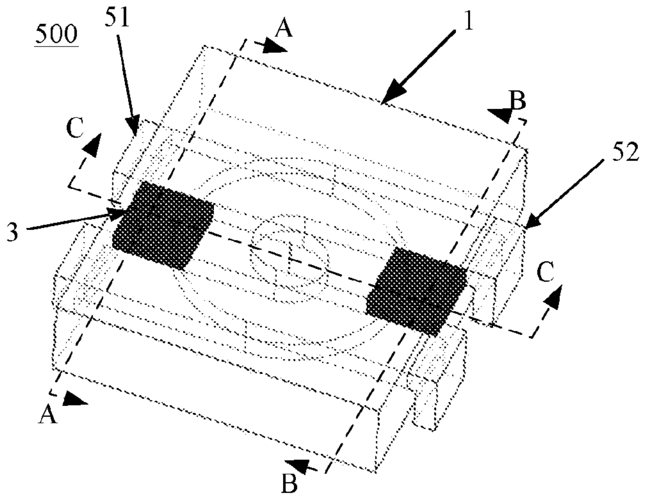
FIG. 5*a* is a schematic perspective diagram of a coupled inductor in Embodiment 5 of the present disclosure.
Figure 5B:
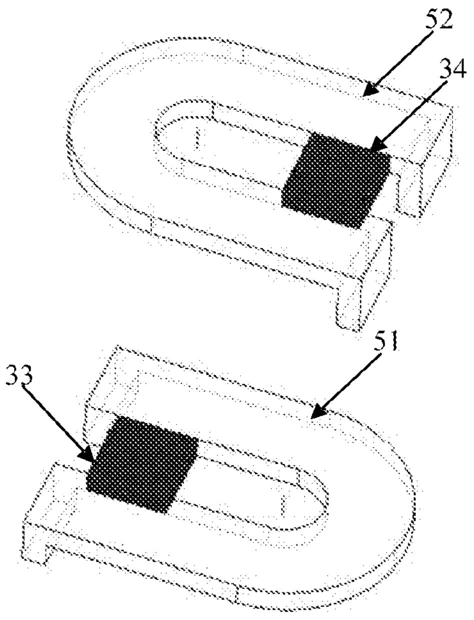
FIG. 5*b* is an exploded view of the coupled inductor in FIG. 5*a*, showing windings and adjustment structures.
Figure 5C:
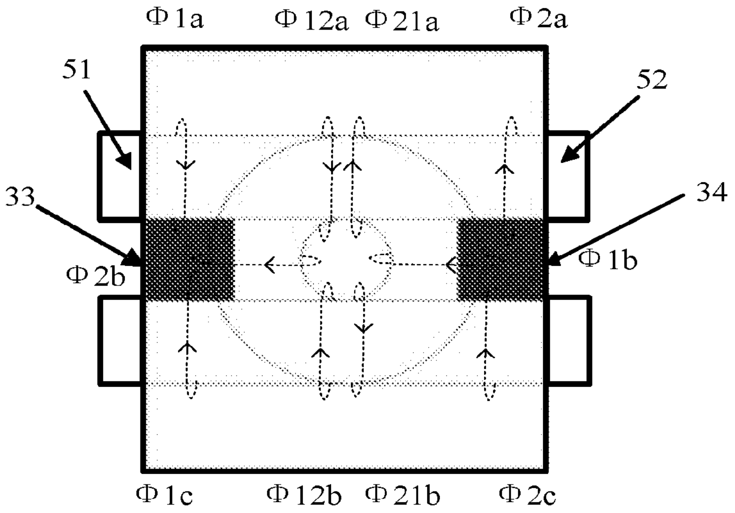
FIG. 5*c* is a top view of the coupled inductor in FIG. 5*a*, showing magnetic flux distribution of the coupled inductor.
Figure 5D:
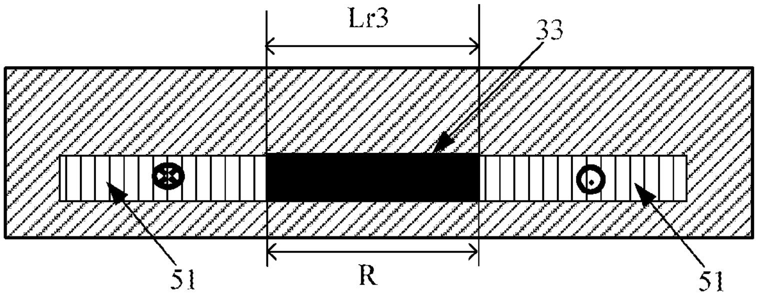
FIG. 5*d* is a cross-sectional view of the coupled inductor taken along line A-A in FIG. 5*a;*
Figure 5E:
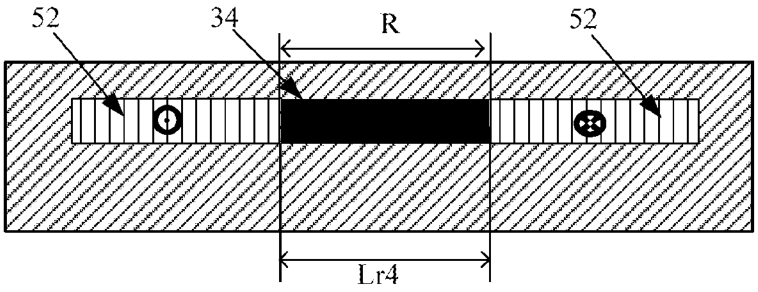
FIG. 5*e* is a cross-sectional view of the coupled inductor taken along line B-B in FIG. 5*a;*
Figure 5F:
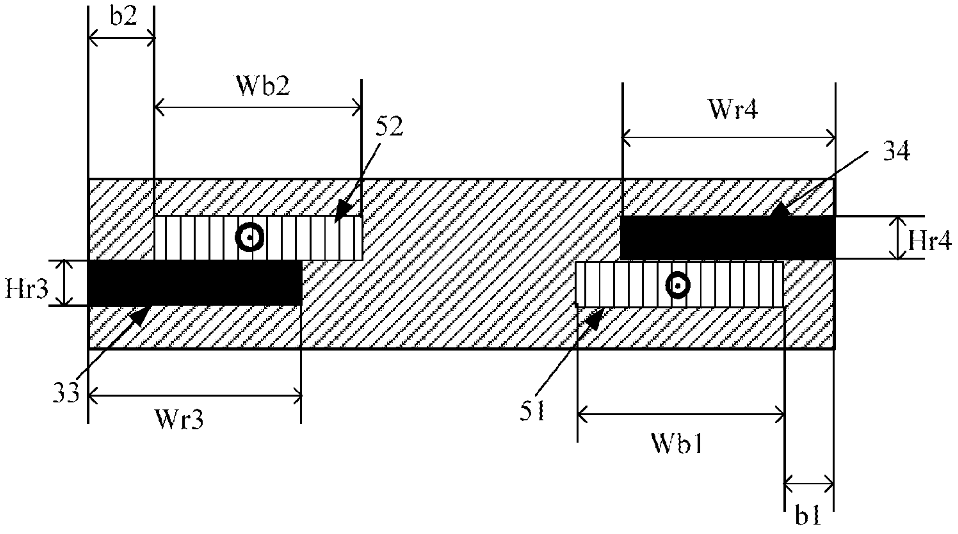
FIG. 5*f* is a cross-sectional view of the coupled inductor taken along line C-C in FIG. 5*a:*

FIG. 5*a* is a schematic perspective view of a coupled inductor in Embodiment 5 of the present disclosure; FIG. 5*b* is an exploded view of the coupled inductor in FIG. 5*a* showing windings and adjustment structures; FIG. 5*c* is a top view of the coupled inductor in FIG. 5*a*, showing magnetic flux distribution of the coupled inductor; FIG. 5*d* is a cross-sectional view of the coupled inductor taken along line A-A in FIG. 5*a*; FIG. 5*e* is a cross-sectional view of the coupled inductor taken along line B-B in FIG. 5*a*; and FIG. 5*f* is a sectional view of the coupled inductor taken along line C-C in FIG. 5*a*.

As shown in FIGS. 5*a*-5*f*, a coupled inductor 500 is similar in structure to the coupled inductor 200 in the Embodiment 2, and differences therebetween are the shapes of the windings. In the coupled inductor 200, the first winding 21 and the second winding 22 are U-shaped. In the coupled inductor 500, a first winding 51 and a second winding 52 are both C-shaped. Each of the C-shaped first winding 51 and the C-shaped second winding 52 includes two linear portions parallel to each other and an arc portion, and the arc portion connects the two linear portions together. The window enclosed by the first winding 51 and the second winding 52 is cylinder-shaped. In other embodiments, the shape of the windings may be other shapes, and the application is not limited thereto. In combination with FIG. 5*c*-5*f*, a third adjustment structure 33 in the coupled inductor 500 is same as the third adjustment structure 33 in the coupled inductor 200, a fourth adjustment structure 34 in the coupled inductor 500 is same as the fourth adjustment structure in the coupled inductor 200. It is not repeated here.

Embodiment 6

Figure 6A:
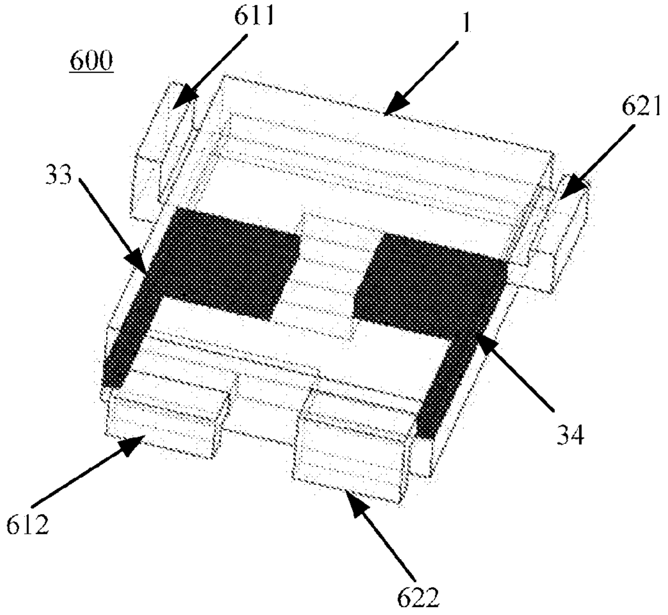
FIG. 6*a* is a schematic perspective diagram of a coupled inductor in Embodiment 6 of the present disclosure.
Figure 6B:
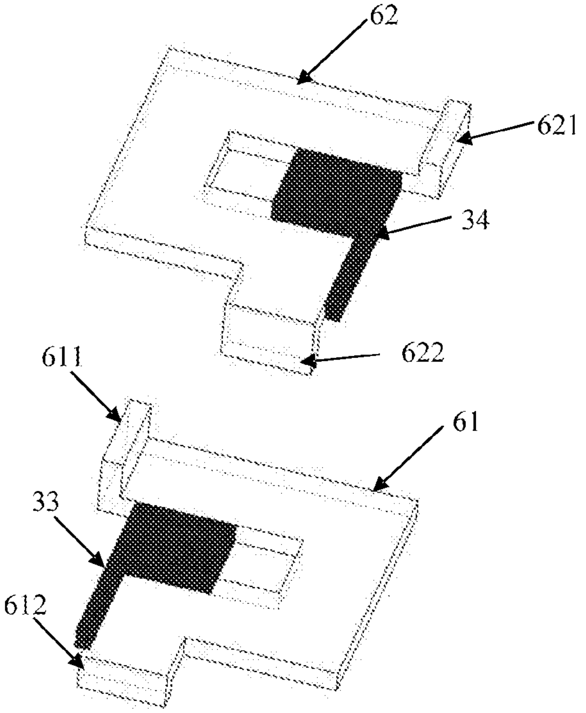
FIG. 6*b* is an exploded view of the coupled inductor in FIG. 6*a*, showing windings and adjustment structures.

FIG. 6*a* is a schematic perspective diagram of a coupled inductor in Embodiment 6 of the present disclosure; FIG. 6*b* is an exploded view of the coupled inductor in FIG. 6*a*, showing windings and adjustment structures.

As shown in FIGS. 6*a* and 6*b*, the coupled inductor 600 includes a magnetic core 1, a first winding 61 and a second winding 62 located in the magnetic core 1, and the adjustment structure 3 located in the magnetic core 1. A first end 611 of the first winding 61 protrudes from the first side of the magnetic core 1, a first end 621 of the second winding 62 protrudes from the second side of the magnetic core 1, and a second end 612 of the first winding 61 and a second end 622 of the second winding 62 protrude from the third side of the magnetic core 1. The first side is opposite to the second side, and the third side is adjoining the first side and the second side. The second end 612 of the first winding 61 and the second end 622 of the second winding 62 are disposed to be protruded from a same side of the magnetic core capable of being electrically connected together. In addition, the first end 611 of the first winding 61 and the first end 621 of the second winding 62 are bent upward, and the second end 612 of the first winding 61 and the second end 622 of the second winding 62 are bent downward.

In this embodiment, the adjustment structure 3 includes a third adjustment structure 33 and a fourth adjustment structure 34, the third adjustment structure 33 in the coupled inductor 600 is similar to the third adjustment structure 33 in the coupled inductor 200 in the Embodiment 2, and the fourth adjustment structure 34 in the coupled inductor 600 is similar to the fourth adjustment structure 34 in the coupled inductor 200. The differences therebetween include that the third adjustment structure 33 in the coupled inductor 600 also extends to the third side of the magnetic core 1 due to the second end 612 of the first winding 61 protruding from the third side of the magnetic core 1 and that the fourth adjustment structure 34 also extends to the third side of the magnetic core 1 due to the second end 622 of the second winding 62 extending from the third side of the magnetic core 1.

Embodiment 7

Figure 7A:
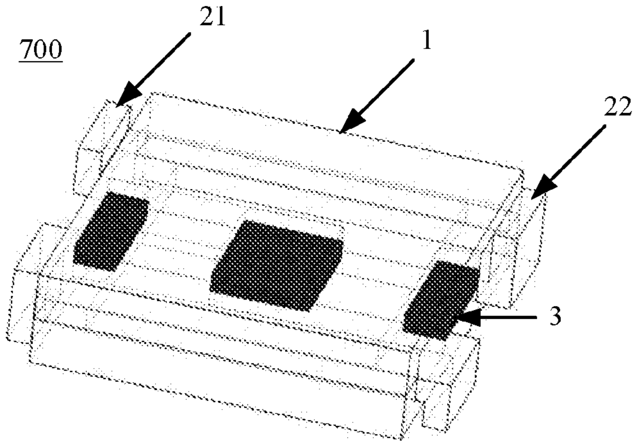
FIG. 7*a* is a schematic perspective diagram of a coupled inductor in Embodiment 7 of the present disclosure.
Figure 7B:
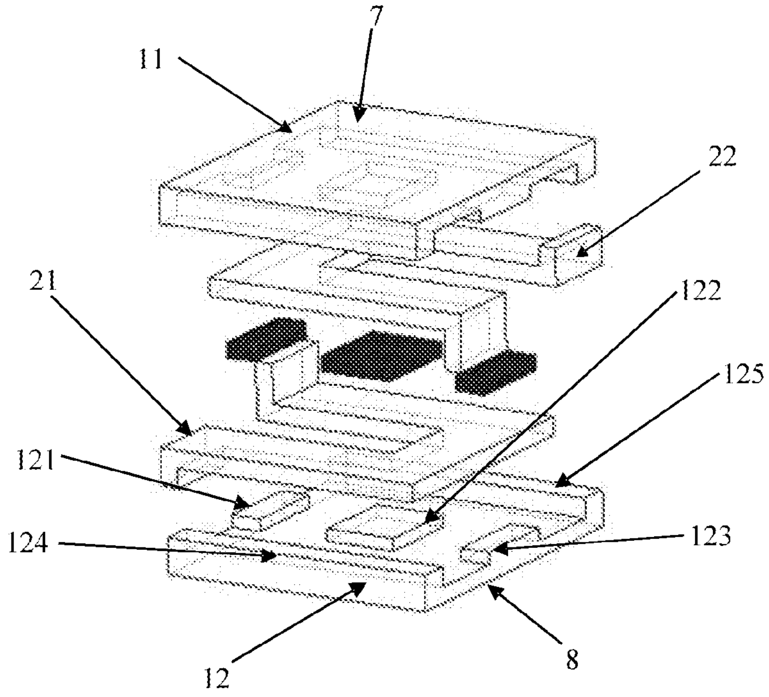
FIG. 7*b* is an exploded view of the coupled inductor in FIG. 7*a*, showing windings and adjustment structures.

FIG. 7*a* is a schematic perspective diagram of a coupled inductor in Embodiment 7 of the present disclosure; FIG. 7*b* is an exploded view of the coupled inductor in FIG. 7*a*, showing windings and adjustment structures. As shown in FIGS. 7*a*-7*b*, unlike the magnetic core formed by the powder core magnetic material in the above embodiments, the magnetic core 1 in this embodiment is a ferrite-based magnetic core. Due to different magnetic materials, the manufacturing process of the inductor would also be different. For alloy magnetic powder core, the windings and the magnetic core can be integrally formed to prepare the inductor. However, for ferrite materials, the windings and the magnetic core may generally not be integrally formed because subsequent high temperature sintering is required; thus a split assembly method may be used. That is, the molding and sintering of the magnetic core 1 is performed first, and then the first winding 21 and the second winding 22 are assembled with the magnetic core 1. The manufacturing process is simple.

In this embodiment, the magnetic core 1 includes a first cover plate 7 and a second cover plate 8 opposite to each other, and a first winding post, a second winding post, a third winding post, a first side post, and a second side post connecting the first cover plate 7 to the second cover plate 8. The connection of elements in this application may refer to a direct contacting connection, an indirect connection through an intermediate structure, an integral structure of the elements or an assembled structure of the elements. The adjustment structure 3 is located on at least one of the first winding post, the second winding post, and the third winding post. For example, each of the three winding posts is disposed with the adjustment structure 3. The first winding 21 surrounds the first winding post and the second winding post, and the second winding 22 surrounds the second winding post and the third winding post. The adjustment structure 3 may include at least one of an air gap, an insulating glue, and other magnetic material having a relative magnetic permeability lower than that of a magnetic core 11 and a magnetic core 12, so as to adjust the leakage inductance.

Specifically, the magnetic core 1 may be formed by assembling the first magnetic core 11 and the second magnetic core 12 opposite to each other. The second magnetic core 12 includes a first magnetic post 121, a second magnetic post 122, a third magnetic post 123, a fourth magnetic post 124, a fifth magnetic post 125, and a cover plate 8, wherein the first magnetic post 121, the second magnetic post 122, and the third magnetic post 123 are sequentially arranged in a width direction, the fourth magnetic post 124 and the fifth magnetic post 125 are arranged along the length direction, the cover plate 8 is connected to the first magnetic post 121, the second magnetic post 122, the third magnetic post 123, the fourth magnetic post 124, and the fifth magnetic post 125, the first magnetic post 121 and the third magnetic post 123 are located on opposite sides of the cover plate 8, the fourth magnetic post 124 and the fifth magnetic post 125 are located on the opposite sides of the cover plate 8, and the cover plate 8 and the five magnetic posts may be integrally formed. The first magnetic core 11 has a same structure as the second magnetic core 12 and also includes five magnetic posts and a cover plate 7, and the arrangement of the magnetic posts of the first magnetic core 11 and the arrangement of the magnetic posts of the second magnetic core 12 are same. The first magnetic core 11 and the second magnetic core 12 are assembled and connected to form the magnetic core 1. The first magnetic post of the first magnetic core 11 are connected to the first magnetic post 121 of the second magnetic core 12 to form the first winding post, the second magnetic post of the first magnetic core 11 are connected to the second magnetic post 122 of the second magnetic core 12 to form the second winding post, the third magnetic post of the first magnetic core 11 are connected to the third magnetic post 123 of the second magnetic core 12 to form the third winding post, the fourth magnetic post of the first magnetic core 11 are connected to the fourth magnetic post 124 of the second magnetic core 12 to form a first side post, the fifth magnetic post of the first magnetic core 11 are connected to the fifth magnetic post 125 of the second magnetic core 12 to form a second side post, the cover plate 7 serves as a first cover plate, and the cover plate 8 serves as a second cover plate. Part of the adjustment structure 3 is located between the first magnetic post of the first magnetic core 11 and the first magnetic post 121 of the second magnetic core 12, part of the adjustment structure 3 is located between the second magnetic post of the first magnetic core 11 and the second magnetic post 122 of the second magnetic core 12, and part of the adjustment structure 3 is located between the third magnetic post of the first magnetic core 11 and the third magnetic post 123 of the second magnetic core 12. The first magnetic core 11 and the second magnetic core 12 surround a winding window, and the first winding 21 and the second winding 22 are located in the winding window.

In other embodiments, the first magnetic core and the second magnetic core may have different magnetic core structures. For example, the first magnetic core includes five magnetic posts and a cover plate, and the second magnetic core may be an I-shaped flat plate structure without magnetic posts. The structure of the first magnetic core and the second magnetic core is not limited thereto.

Embodiment 8

Figure 8:
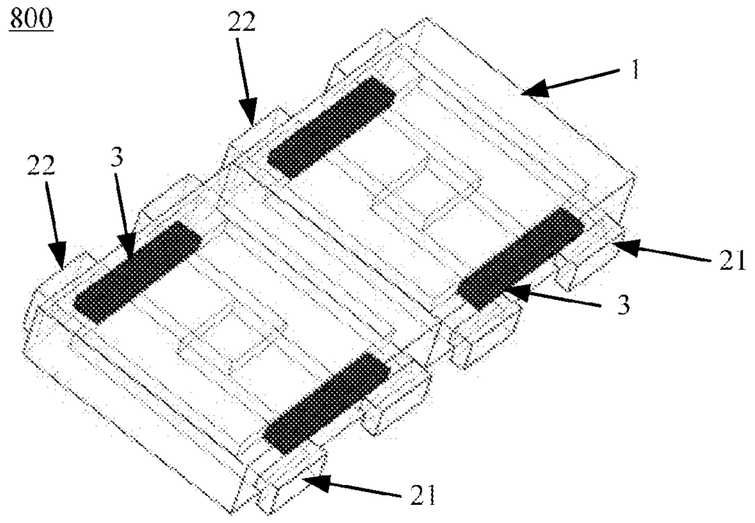
FIG. 8 is a schematic perspective diagram of a coupled inductor in Embodiment 8 of the present disclosure.

FIG. 8 is a schematic perspective diagram of a coupled inductor in Embodiment 8 of the present disclosure. As shown in FIG. 8, a coupled inductor 800 includes a magnetic core 1, a plurality of winding units, and a plurality of adjustment structures 3. Each of the winding units includes a first winding 21 and a second winding 22, at least part of the first winding 21 and at least part of the second winding 22 are located in the magnetic core 1, a stacked portion of the first winding 21 and a stacked portion of the second winding 22 are stacked in a height direction, a non-stacked portion of the first winding 21 and the second winding 22 are not stacked in the height direction, and a non-stacked portion 22 of the second winding and the first winding 21 are not stacked in the height direction. The plurality of adjustment structures 3 are located in the magnetic core and respectively correspond to the plurality of winding units. The adjustment structures 3 may correspond to the winding units in an one-to-one manner. Each of the adjustment structures 3 is adjoining the non-stacked portion of the first winding 31 and the non-stacked portion of the second winding 22, and a magnetic permeability of the adjustment structure is less than a magnetic permeability of the magnetic core.

Different from that there is a single two-phase coupled inductor shown in the Embodiment 1 to Embodiment 7, in this embodiment, the coupled inductor 800 includes a plurality of two-phase coupled inductors, such as two or more two-phase coupled inductors. Each of the two-phase coupled inductors may be in any of the above embodiments, and a plurality of two-phase coupled inductors may be located in a same magnetic core 1. When the coupled inductor 800 is applied to a power module, the plurality of two-phase coupled inductors may be connected in parallel. In the embodiment, each of the two-phase coupled inductors is internally in an anti-coupling relationship, the magnetic fluxes generated by the two windings are offset by each other, and there is no coupling relationship or only weak coupling relationship between any two of the two-phase coupled inductors.

Embodiment 9

As shown in FIG. 1*g*, the present disclosure also provides a power module, such as a two-phase Buck converter. The power module includes a first switch circuit SW1, a second switch circuit SW2, and a coupled inductor 40. The coupled inductor 40 may be any kind of the coupled inductor in the abovementioned embodiments, and the coupled inductor 40 includes a first winding Ls1 and a second winding Ls2. The first switch circuit SW1 is electrically connected to a first end of the first winding Ls1, the second switch circuit SW2 is electrically connected to a first end of the second winding Ls2, so that when current flows from the first end of the first winding Ls1 and the first end of the second winding Ls2 to the coupled inductor 40, directions of magnetic fluxes generated by the two windings are opposite, that is, an anti-coupling relationship is formed. A second end of the first winding Ls1 and a second end of the second winding Ls2 are electrically connected to an access terminal V2 of an external load. By applying the coupled inductor in the above embodiments to the power module, power density of the power module may be effectively improved. In order to reduce output ripple of the power module, the first switch circuit SW1 and the second switch circuit SW2 may work in a phase-staggered way, that is, the current on the two-phase coupled inductor differs by 180 degrees from each other.

Those skilled in the art will readily contemplate other embodiments of the present disclosure after considering the specification and practicing the disclosure. This application is intended to cover any variations, uses, or adaptations of this disclosure that conform to the general principles of this disclosure and include the common general knowledge or conventional technical means in the technical field not disclosed by this disclosure. It is intended that the specification and examples are considered as exemplary only, with a true scope and spirit of the disclosure being indicated by the following claims.

What is claimed is:

1. A coupled inductor, comprising:

a magnetic core;

a first winding and a second winding, wherein, at least part of the first winding and at least part of the second winding are located in the magnetic core, a stacked portion of the first winding and a stacked portion of the second winding are stacked in a height direction, and a non-stacked portion of the first winding and the second winding are not stacked in the height direction, a non-stacked portion of the second winding and the first winding are not stacked in the height direction; and an adjustment structure, configured to be located in the magnetic core and adjoining the non-stacked portion of the first winding and the non-stacked portion of the second winding, wherein a magnetic permeability of the adjustment structure is less than a magnetic permeability of the magnetic core, wherein the stacked portion of the first winding and the stacked portion of the second winding are in contact with each other through an insulating layer and no magnetic material is disposed between the stacked portion of the first winding and the stacked portion of the second winding, and the stacked portion of the first winding and the stacked portion of the second winding are not stacked with the adjustment structure in the height direction.

2. The coupled inductor according to claim 1, wherein, the first winding extends from a first end of the first winding to a second end of the first winding and wraps around an axis in the height direction along a first direction, and the second winding extends from a first end of the second winding to a second end of the second winding and wraps around the axis in the height direction along a second direction opposite to the first direction, and a polarity of the first end of the first winding and a polarity of the first end of the second winding are opposite.

3. The coupled inductor according to claim 2, wherein, when a first current flows in via the first end of the first winding and flows out from the second end of the first winding, and a second current flows in via the first end of the second winding and flows out from the second end of the second winding, a magnetic flux generated by the first current in the stacked portion of the first winding and a magnetic flux generated by the second current in the stacked portion of the second winding cancel each other at least in part, and the magnetic flux generated by the first current in the non-stacked portion of the first winding and the magnetic flux generated by the second current in the non-stacked portion of the second winding are adjusted by the adjustment structure.

4. The coupled inductor according to claim 1, wherein, a number of turns of the first winding is one, a number of turns of the second winding is one, the first winding comprises a single-stranded wire, a multi-stranded wire, or a sheet metal piece, the second winding comprises a single-stranded wire, a multi-stranded wire, or a sheet metal piece, the first winding is C-shaped or U-shaped, and the second winding is C-shaped or U-shaped.

5. The coupled inductor according to claim 1, wherein, the first end and the second end of the first winding protrude from a first side of the magnetic core, the first end and the second end of the second winding protrude from a second side of the magnetic core, and the first side is opposite to the second side; or the first end of the first winding protrudes from the first side of the magnetic core, the first end of the second winding protrudes from the second side of the magnetic core, the second end of the first winding and the second end of the second winding protrude from a third side of the magnetic core, the first side is opposite to the second side, and the third side is adjacent to the first side and the second side.

6. The coupled inductor according to claim 5, wherein, the first end of the first winding and the first end of the second winding are bent upward in the height direction, the second end of the first winding and the second end of the second winding are bent downward in the height direction, or the first end of the first winding, the second end of the first winding, the first end of the second winding, and the second end of the second winding are bent downward in the height direction.

7. The coupled inductor according to claim 1, wherein, the stacked portion of the first winding comprises a first stacked portion and a second stacked portion, the non-stacked portion of the first winding comprises a first non-stacked portion, a second non-stacked portion, and a third non-stacked portion, and the first non-stacked portion, the first stacked portion, the second non-stacked portion, the second stacked portion, and the third non-stacked portion of the first winding are connected in sequence from the first end of the first winding to the second end of the first winding;

the stacked portion of the second winding comprises a first stacked portion and a second stacked portion, the non-stacked portion of the second winding comprises a first non-stacked portion, a second non-stacked portion, and a third non-stacked portion, and the first non-stacked portion, the first stacked portion, the second non-stacked portion, the second stacked portion, and the third non-stacked portion of the second winding are connected in sequence from the first end of the second winding to the second end of the second winding;

a contact surface between the first winding and the second winding is located on a horizontal plane.

8. The coupled inductor according to claim 7, wherein, the adjustment structure comprises a first adjustment structure and a second adjustment structure, wherein the first adjustment structure is adjoining the first non-stacked portion of the first winding, the third non-stacked portion of the first winding, and the second non-stacked portion of the second winding, and the first adjustment structure extends from the horizontal plane in a direction away from the first winding;

the second adjustment structure is adjoining the first non-stacked portion of the second winding, the third non-stacked portion of the second winding, and the second non-stacked portion of the first winding, and the second adjustment structure extends from the horizontal plane in a direction away from the second winding.

9. The coupled inductor according to claim 8, wherein, a first sub-portion of the first adjustment structure and the first non-stacked portion of the first winding are stacked in the height direction, a second sub-portion of the first adjustment structure and the third non-stacked portion of the first winding are stacked in the height direction, a length of the first sub-portion of the first adjustment structure is greater than or equal to a height of the first adjustment structure, a length of the second sub-portion of the first adjustment structure is greater than or equal to the height of the first adjustment structure, the first adjustment structure is adjoining the first side of the magnetic core, the first adjustment structure is located between the first side and the second non-stacked portion of the second winding, and a height of the first adjustment structure is less than or equal to a height of the second winding;

a first sub-portion of the second adjustment structure and the first non-stacked portion of the second winding are stacked in the height direction, a second sub-portion of the second adjustment structure and the third non-stacked portion of the second winding are stacked in the height direction, a length of the first sub-portion of the second adjustment structure is greater than or equal to a height of the second adjustment structure, a length of the second sub-portion of the second adjustment structure is greater than or equal to the height of the second adjustment structure, the second adjustment structure is adjoining the second side of the magnetic core opposite to the first side, the second adjustment structure is located between the second side and the second non-stacked portion of the first winding, and the height of the second adjustment structure is less than or equal to the height of the first winding.

10. The coupled inductor according to claim 7, wherein, the adjustment structure comprises a third adjustment structure and a fourth adjustment structure, the third adjustment structure is adjoining the first non-stacked portion of the first winding, the third non-stacked portion of the first winding, and the second non-stacked portion of the second winding, and the third adjustment structure extends from the horizontal plane in the direction away from the second winding;

the fourth adjustment structure is adjoining the first non-stacked portion of the second winding, the third non-stacked portion of the second winding, and the second non-stacked portion of the first winding, and the fourth adjustment structure extends from the horizontal plane in the direction away from the first winding.

11. The coupled inductor according to claim 10, wherein, the third adjustment structure is located between the first non-stacked portion of the first winding and the third non-stacked portion of the first winding, the third adjustment structure is adjoining the first side of the magnetic core, a first sub-portion of the third adjustment structure and the second non-stacked portion of the second winding are stacked in the height direction, a width of the first sub-portion of the third adjustment structure is greater than or equal to a height of the third adjustment structure and less than or equal to a width of the second non-stacked portion of the second winding, and the height of the third adjustment structure is less than or equal to the height of the first winding;

the fourth adjustment structure is located between the first non-stacked portion of the second winding and the third non-stacked portion of the second winding, the fourth adjustment structure is adjoining the second side, which is opposite to the first side, of the magnetic core, a first sub-portion of the fourth adjustment structure and the second non-stacked portion of the first winding are stacked in the height direction, a width of the first sub-portion of the fourth adjustment structure is greater than or equal to a height of the fourth adjustment structure and less than or equal to a width of the second non-stacked portion of the first winding, and a height of the fourth adjustment structure is less than or equal to the height of the second winding.

12. The coupled inductor according to claim 7, wherein, the adjustment structure comprises a fifth adjustment structure and a sixth adjustment structure, the fifth adjustment structure is located between a first stacked portion of the second winding and a second stacked portion of the second winding, and the fifth adjustment structure is adjoining the first stacked portion of the second winding and the second stacked portion of the second winding, the fifth adjustment structure is adjoining the second non-stacked portion of the first winding and the second non-stacked portion of the second winding, the fifth adjustment structure extends from the horizontal plane in a direction away from the first winding, and a height of the fifth adjustment structure is less than or equal to the height of the second winding;

the sixth adjustment structure is located between a first stacked portion of the first winding and a second stacked portion of the first winding, and the sixth adjustment structure is adjoining the first stacked portion of the first winding and the second stacked portion of the first winding, the sixth adjustment structure is adjoining the second non-stacked portion of the first winding and the second non-stacked portion of the second winding, the sixth adjustment structure extends from the horizontal plane in the direction away from the second winding, and a height of the sixth adjustment structure is less than or equal to the height of the first winding.

13. The coupled inductor according to claim 1, wherein, the magnetic core comprises an iron powder, an alloy powder, an amorphous powder, or a nanocrystalline powder, the first winding and the second winding are embedded in the magnetic core, the adjustment structure is embedded in the magnetic core, and the coupled inductor is integrally formed.

14. The coupled inductor according to claim 1, wherein, the magnetic core comprises a ferrite, and the first winding, the second winding, and the magnetic core are assembled together.

15. The coupled inductor according to claim 14, wherein, the magnetic core comprises a first cover plate and a second cover plate disposed opposite to each other, and a first winding post, a second winding post, a third winding post, a first side post, and a second side post connecting the first cover plate to the second cover plate, and the adjustment structure is located on at least one of the first winding post, the second winding post, and the third winding post; and the first winding surrounds the first winding post and the second winding post, and the second winding surrounds the second winding post and the third winding post.

16. The coupled inductor according to claim 15, wherein, the magnetic core is formed by connecting a first magnetic core to a second magnetic core opposite to each other, any one of the first magnetic core and the second magnetic core comprises a first magnetic post, a second magnetic post, and a third magnetic post arranged in sequence in a width direction, a fourth magnetic post and a fifth magnetic post arranged in a length direction, and a cover plate connecting to the first magnetic post, the second magnetic post, the third magnetic post, the fourth magnetic post, and the fifth magnetic post, the first magnetic post and the third magnetic post are located on opposite sides of the cover plate, and the fourth magnetic post and the fifth magnetic post are located on opposite sides of the cover plate;

the first magnetic post of the first magnetic core and the first magnetic post of the second magnetic core are connected to each other to form the first winding post, the second magnetic post of the first magnetic core and the second magnetic post of the second magnetic core are connected to each other to form the second winding post, the third magnetic post of the first magnetic core and the third magnetic post of the second magnetic core are connected to each other to form the third winding post, the fourth magnetic post of the first magnetic core and the fourth magnetic post of the second magnetic core are connected to each other to form the first side post, the fifth magnetic post of the first magnetic core and the fifth magnetic post of the second magnetic core are connected to each other to form the second side post, and the cover plate is used as the first cover plate and the second cover plate, respectively;

a part of the adjustment structure is located between the first magnetic post of the first magnetic core and the first magnetic post of the second magnetic core, another part of the adjustment structure is located between the second magnetic post of the first magnetic core and the second magnetic post of the second magnetic core, and another part of the adjustment structure is located between the third magnetic post of the first magnetic core and the third magnetic post of the second magnetic core.

17. The coupled inductor according to claim 1, wherein, the adjustment structure comprises air, insulating glue, or magnetic material.

* * * * *